(12) United States Patent
López

(10) Patent No.: US 11,954,115 B2
(45) Date of Patent: *Apr. 9, 2024

(54) METHODS AND SYSTEMS FOR WAVELET BASED REPRESENTATION

(71) Applicant: QlikTech International AB, Lund (SE)

(72) Inventor: José Diaz López, Lund (SE)

(73) Assignee: QlikTech International AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,369

(22) Filed: Jul. 19, 2022

(65) Prior Publication Data
US 2022/0365946 A1 Nov. 17, 2022

Related U.S. Application Data

(63) Continuation of application No. 16/879,190, filed on May 20, 2020, now Pat. No. 11,423,043, which is a continuation of application No. 14/084,752, filed on Nov. 20, 2013, now Pat. No. 10,698,918.

(51) Int. Cl.
| | | |
|---|---|---|
| *G06F 16/00* | (2019.01) | |
| *G06F 16/22* | (2019.01) | |
| *G06F 16/25* | (2019.01) | |
| *G06F 16/26* | (2019.01) | |
| *H04N 19/33* | (2014.01) | |
| *H04N 19/63* | (2014.01) | |

(52) U.S. Cl.
CPC ........ *G06F 16/258* (2019.01); *G06F 16/2237* (2019.01); *G06F 16/26* (2019.01); *H04N 19/33* (2014.11); *H04N 19/63* (2014.11)

(58) Field of Classification Search
None
See application file for complete search history.

(56) References Cited

U.S. PATENT DOCUMENTS

| | | |
|---|---|---|
| 5,088,052 A | 2/1992 | Spielman |
| 5,189,633 A | 2/1993 | Bonadio |
| 5,561,431 A | 10/1996 | Peele |

(Continued)

FOREIGN PATENT DOCUMENTS

| | | |
|---|---|---|
| EP | 0859335 A2 | 8/1998 |
| WO | WO-2004/019003 A2 | 3/2004 |
| WO | WO-2015/074884 A1 | 5/2015 |

OTHER PUBLICATIONS

"Multi-resolution image data fusion using 2-D discrete wavelet transform and self-organizing neural networks" by Q.P. Zhang M. Liang W.C. Sun, Dept. of Computer Science, Fudan University, Shanghai, 200433, China. 2004 ACM 1-58113-884-9/04/0006 (Year : 2004).*

(Continued)

*Primary Examiner* — Hasanul Mobin
(74) *Attorney, Agent, or Firm* — Ballard Spahr LLP

(57) ABSTRACT

Methods and systems for representing data are disclosed. An example method can comprise providing a first representation of data and receiving a request to change resolution of the data. An example method can comprise, transforming, based on at least one wavelet function, the data to at least one of reduced data or expanded data. An example method can comprise providing a second representation of the data based on at least one of the reduced data or expanded data.

38 Claims, 22 Drawing Sheets

(56) References Cited

U.S. PATENT DOCUMENTS

| | | | |
|---|---|---|---|
| 5,819,215 A | 10/1998 | Dobson | |
| 6,035,306 A * | 3/2000 | Lowenthal | G06F 11/3485 |
| 6,195,465 B1 * | 2/2001 | Zandi | H04N 19/46 |
| | | | 375/E7.064 |
| 6,334,123 B1 | 12/2001 | Ross | |
| 6,643,406 B1 * | 11/2003 | Hajjahmad | G06T 5/10 |
| | | | 382/240 |
| 6,751,363 B1 | 6/2004 | Natsev | |
| 6,853,466 B1 * | 2/2005 | Harada | G06K 15/1822 |
| | | | 358/1.9 |
| 7,058,621 B1 | 6/2006 | Wolge | |
| 7,181,056 B2 | 2/2007 | Campanini | |
| 7,206,804 B1 * | 4/2007 | Deshpande | H04L 65/756 |
| | | | 709/236 |
| 7,987,186 B1 | 7/2011 | Joshi | |
| 8,736,611 B1 | 5/2014 | Tulasi | |
| 2003/0026341 A1 | 2/2003 | Li | |
| 2003/0118241 A1 * | 6/2003 | Zandi | H04N 19/61 |
| | | | 375/E7.064 |
| 2003/0219162 A1 | 11/2003 | Sano | |
| 2003/0228061 A1 * | 12/2003 | Sakuyama | G06T 3/4084 |
| | | | 382/233 |
| 2004/0015783 A1 | 1/2004 | Lennon | |
| 2004/0114781 A1 | 6/2004 | Cho | |
| 2005/0207495 A1 * | 9/2005 | Ramasastry | H04N 19/547 |
| | | | 375/E7.113 |
| 2005/0207664 A1 * | 9/2005 | Ramasastry | H04N 19/64 |
| | | | 375/E7.03 |
| 2006/0008003 A1 * | 1/2006 | Ji | H04N 19/63 |
| | | | 375/240.18 |
| 2006/0053004 A1 * | 3/2006 | Ceperkovic | H04N 19/1883 |
| | | | 704/221 |
| 2006/0095858 A1 * | 5/2006 | Hao | G06Q 10/10 |
| | | | 715/764 |
| 2007/0219758 A1 * | 9/2007 | Bloomfield | G01V 11/002 |
| | | | 702/6 |
| 2007/0247462 A1 | 10/2007 | Bell | |
| 2008/0002851 A1 | 1/2008 | Shi | |
| 2008/0212883 A1 * | 9/2008 | Park | H04N 19/17 |
| | | | 375/E7.182 |
| 2008/0218635 A1 | 9/2008 | Tsuruoka | |
| 2009/0067735 A1 | 3/2009 | Mignet et al. | |
| 2010/0046628 A1 * | 2/2010 | Bhaskaran | H04N 19/61 |
| | | | 375/E7.026 |
| 2011/0055222 A1 * | 3/2011 | Choudur | G06F 17/148 |
| | | | 707/E17.014 |
| 2011/0075903 A1 | 3/2011 | Turiel | |
| 2011/0087662 A1 | 4/2011 | Darby, Jr. | |
| 2011/0176743 A1 * | 7/2011 | Sankar | H04N 19/182 |
| | | | 382/248 |
| 2011/0286525 A1 * | 11/2011 | Kamisli | H04N 19/122 |
| | | | 375/240.18 |
| 2012/0221589 A1 | 8/2012 | Yuval | |

OTHER PUBLICATIONS

Smith et al: "A wavelet framework for adapting data cube views for OLAP", IEEE Transactions On Knowledge and Data Engineering, IEEE Service Center, vol. 16, No. 5, (2004), pp. 552-565.

Stolte, et al: "Multiscale visualization using data cubes", Information Visualization, 2002. INFOVIS 2002. IEEE Symposium On Oct. 28-29, 2002,(2002), pp. 7-14.

Wang, et al: "The Application of Data Cubes in Business Data Visualization", Computing in Science and Engineering, IEEE Service Center, vol. 14, No. 6, (2012), pp. 44-50.

International Search Report and Written Opinion were dated Mar. 4, 2015 by the International Searching Authority for International Application No. PCT/EP2014/073901, filed on Nov. 6, 2014 and published as WO 2015/074884 A1 dated May 28, 2015 (Applicant—QlikTech International AB) (9 Pages).

International Preliminary Report on Patentability was dated May 24, 2016 by the International Searching Authority for International Application No. PCT/EP2014/073901, filed on Nov. 6, 2014 and published as WO 2015/074884 A1 dated May 28, 2015 (Applicant—QlikTech International AB) (6 Pages).

Office Action was dated Aug. 16, 2019 by the European Patent Office for EP Application No. 14803061.2, filed on Nov. 6, 2014 and published as EP 3072296 dated Sep. 28, 2016 (Applicant—QlikTech International AB) (8 Pages).

* cited by examiner

FIG. 5

| Type | Engine | Transmission | Price | Make | Model |
|---|---|---|---|---|---|
| Coupe | 1.8 | Automatic | 19,000 | Honda | Civic |
| Coupe | 1.8 | Manual | 18,000 | Honda | Civic |
| Coupe | 2.4 | Manual | 23,000 | Honda | Accord |
| Coupe | 3.6 | Automatic | 23,000 | Chevrolet | Camaro |
| Coupe | 3.7 | Manual | 22,000 | Ford | Mustang |
| Hatchback | 1.6 | Manual | 14,000 | Ford | Fiesta |
| Hatchback | 1.8 | Automatic | 16,000 | Chevrolet | Sonic |
| Hatchback | 1.8 | Automatic | 20,000 | Toyota | Matrix |
| Hatchback | 1.8 | Automatic | 22,000 | Toyota | Prius |
| Hatchback | 2.0 | Manual | 20,000 | Ford | Focus |
| Sedan | 2.0 | Automatic | 25,000 | Chevrolet | Cruze |
| Sedan | 2.0 | Automatic | 30,000 | Ford | Fusion |
| Sedan | 2.4 | Manual | 23,000 | Honda | Accord |
| Sedan | 2.5 | Automatic | 22,000 | Ford | Fusion |
| Sedan | 2.5 | Automatic | 33,000 | Cadillac | ATS |
| Sedan | 3.5 | Automatic | 28,000 | Ford | Taurus |

| Record | Type | Engine | Transmission | Price | Make | Model |
|---|---|---|---|---|---|---|
| 1 | 0 | 1 | 0 | 3 | 3 | 3 |
| 2 | 0 | 1 | 1 | 2 | 3 | 3 |
| 3 | 0 | 3 | 1 | 6 | 3 | 0 |
| 4 | 0 | 6 | 0 | 6 | 1 | 2 |
| 5 | 0 | 7 | 1 | 5 | 2 | 9 |
| 6 | 1 | 0 | 1 | 0 | 2 | 5 |
| 7 | 1 | 1 | 0 | 1 | 1 | 11 |
| 8 | 1 | 1 | 0 | 4 | 4 | 8 |
| 9 | 1 | 1 | 0 | 5 | 4 | 10 |
| 10 | 1 | 2 | 1 | 4 | 2 | 6 |
| 11 | 2 | 2 | 0 | 7 | 1 | 4 |
| 12 | 2 | 2 | 0 | 9 | 2 | 7 |
| 13 | 2 | 3 | 1 | 6 | 3 | 0 |
| 14 | 2 | 4 | 0 | 5 | 2 | 6 |
| 15 | 2 | 4 | 0 | 10 | 0 | 1 |
| 16 | 2 | 5 | 0 | 8 | 2 | 12 |

FIG. 7

| Record | Engine | Price | Engine | Price |
|--------|--------|-------|--------|-------|
| 1 | 1 | 3 | 1.8 | 19,000 |
| 2 | 1 | 2 | 1.8 | 18,000 |
| 3 | 3 | 6 | 2.4 | 23,000 |
| 4 | 6 | 6 | 3.6 | 23,000 |
| 5 | 7 | 5 | 3.7 | 22,000 |
| 6 | 0 | 0 | 1.6 | 14,000 |
| 7 | 1 | 1 | 1.8 | 16,000 |
| 8 | 1 | 4 | 1.8 | 20,000 |
| 9 | 1 | 5 | 1.8 | 22,000 |
| 10 | 2 | 4 | 2.0 | 20,000 |
| 11 | 2 | 7 | 2.0 | 25,000 |
| 12 | 2 | 9 | 2.0 | 30,000 |
| 13 | 3 | 6 | 2.4 | 23,000 |
| 14 | 4 | 5 | 2.5 | 22,000 |
| 15 | 4 | 10 | 2.5 | 33,000 |
| 16 | 5 | 8 | 3.5 | 28,000 |

FIG. 9

| Record | Engine | Price | Sum(Engine) | Level 1 | Level 2 |
|---|---|---|---|---|---|
| 1 | 1 | 3 | 1.8 | 1.8843 | 3.6986 |
| 2 | 1 | 2 | 1.8 | 3.6905 | 2.6021 |
| 3 | 3 | 6 | 2.4 | 2.5378 | 2.5694 |
| 4 | 6 | 6 | 3.6 | 1.9402 | 3.6194 |
| 5 | 7 | 5 | 3.7 | 2.1035 | 0.0985 |
| 6 | 0 | 0 | 1.6 | 2.1971 | -0.0556 |
| 7 | 1 | 1 | 1.8 | 2.5855 | -0.1952 |
| 8 | 1 | 4 | 1.8 | 3.3665 | -0.4285 |
| 9 | 1 | 5 | 1.8 | -0.2829 | -0.2425 |
| 10 | 2 | 4 | 2.0 | 0.9278 | 0.7952 |
| 11 | 2 | 7 | 2.0 | -0.1548 | -0.1327 |
| 12 | 2 | 9 | 2.0 | -0.0744 | -0.0638 |
| 13 | 3 | 6 | 2.4 | 0.0199 | 0.0171 |
| 14 | 4 | 5 | 2.5 | 0.0717 | 0.0614 |
| 15 | 4 | 10 | 2.5 | -0.3619 | -0.3102 |
| 16 | 5 | 8 | 3.5 | -0.1726 | -0.1479 |

METHODS AND SYSTEMS FOR WAVELET BASED REPRESENTATION

CROSS-REFERENCE TO RELATED PATENT APPLICATIONS

This application is a continuation of U.S. Non-Provisional Application Ser. No. 16/879,190, filed on May 20, 2020, which is a continuation of U.S. Non-Provisional application Ser. No. 14/084,752, filed on Nov. 20, 2013, and issued as U.S. Pat. No. 10,698,918, both of which are incorporated by reference in their entireties herein.

BACKGROUND

Creating visualizations of large data sets is a difficult problem since the process of rendering a significantly large number of data points on a screen or printer with limited resolution involves a significant reduction in the detail available.

There are many statistical methods that are used to reduce the data points displayed on data visualizations. These methods fail to provide a means for representing data more concisely and without losing the information required to return to the original presentation. These methods also fail to allow the users to easily change the resolution of a visualization without extensive use of processing resources. Thus, there is a need for more advanced visualization technology that uses techniques that will enable users to analyze data of significant volume and complexity at varying levels of resolution without materially losing information and without requiring significant processing each time a change in resolution is made.

SUMMARY

It is to be understood that both the following general description and the following detailed description are exemplary and explanatory only and are not restrictive, as claimed. Provided are methods and systems for representing data. An example method can comprise providing a first representation of data and receiving a request to change resolution of the data. The data can be transformed, based on at least one wavelet function, to at least one of reduced data or expanded data. A second representation of the data can be provided based on at least one of the reduced data or expanded data.

In another aspect, an example method can comprise converting a plurality of database records into corresponding vectors. At least one of the vectors can be transformed based on a wavelet function. A representation of values of the database records can be provided based on a result of the transforming the at least one of the vectors.

In another aspect, an example method can comprise receiving first data. The first data can be reduced according to a transformation based on at least one first wavelet function. The reduced first data can be selectively displayed.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2B is a graph illustrating the data from which FIG. 2A is taken;

FIG. 5 illustrates an example database;

FIG. 6 illustrates an example table of data from a database;

FIG. 7 illustrates another example table of a data from a database;

FIG. 9 illustrates another example table of data from a database;

DETAILED DESCRIPTION

Figure 1A:
FIG. 1A is a scatter plot illustrating an example picture.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1B:
FIG. 1B is a scatter plot illustrating the example picture with transformed data according the techniques of the present disclosure.

The present invention relates to visual data reduction techniques that allow the user to easily transition between a display of millions of data points on a visualization to a display of a few thousand points. These techniques enable the reduction of larger data points into a summation of "basis" data without losing the pattern and information density found in the original data. Through the teachings of the present disclosure it is possible to have a significant data reduction ratio, without losing the ability to restore the data that has been reduced to its initial state, and without significant errors and processing resources. While these techniques afford the reduction of the data points being display in a visualization, they intelligently keep the information about the original data points so that transitions can easily and accurately be made the original and the reduced data point visualizations. The techniques described herein allow users to zoom in and zoom out on the visualization with a fraction of time and processing required by current techniques. Using the techniques of the present disclosure the users can also selectively drill down (e.g., zoom in) on specific portions of a visualization by selecting the applicable data points where a drill down is required. As the techniques keep track of the relationship between the original and the reduced data, transitioning between the detailed and the less detailed information is facilitated. For example, FIG. 1A shows a scatter plot which in this case is a rendering of a picture. This rendering has 180,000 data points. FIG. 1B shows the same rendering in which the techniques as will be described in this disclosure have been used to reduce the number of data points to approximately 1000 data points.

Figure 2A:
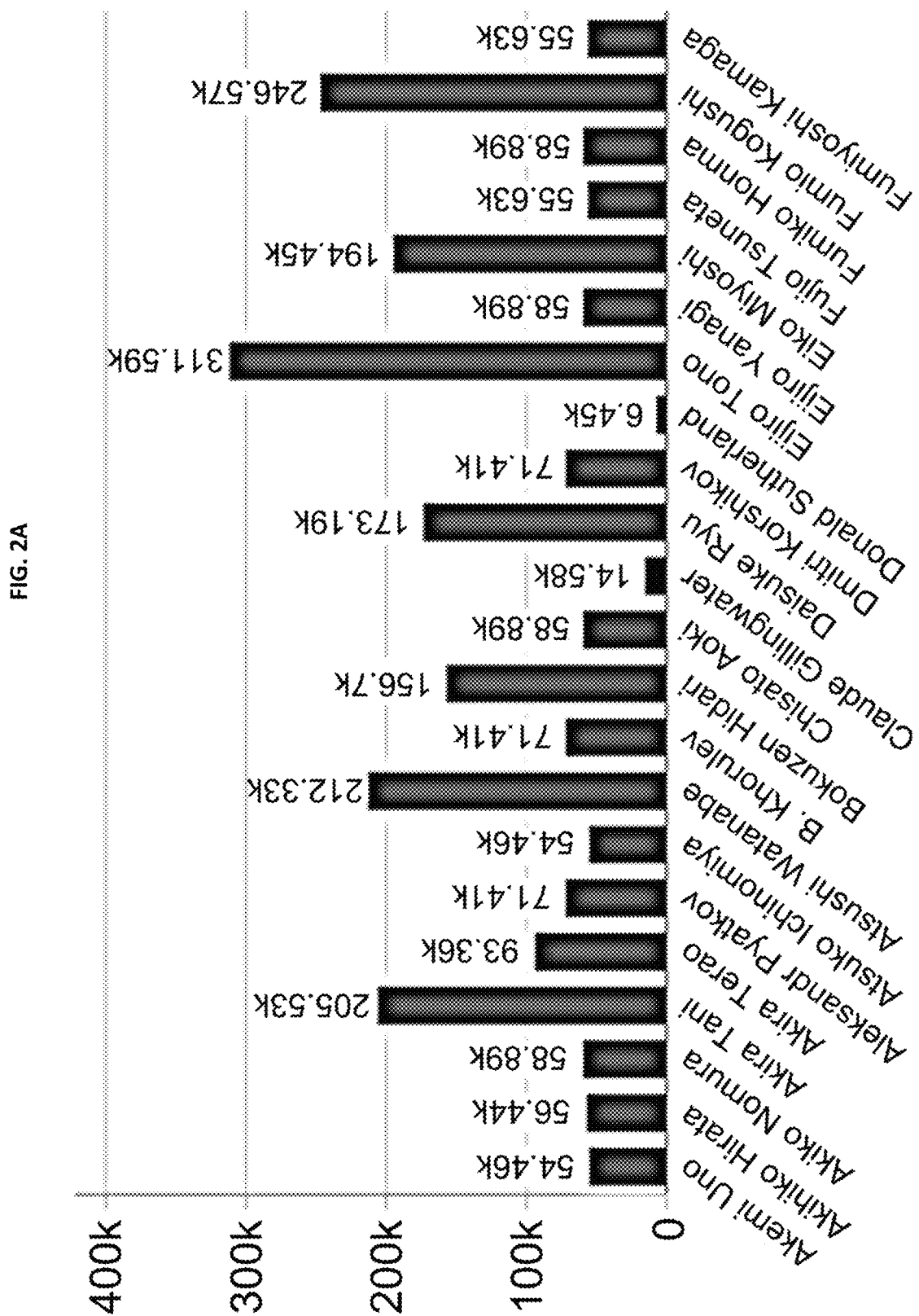
FIG. 2A is a graph illustrating data presented as a bar chart.
Figure 2B:
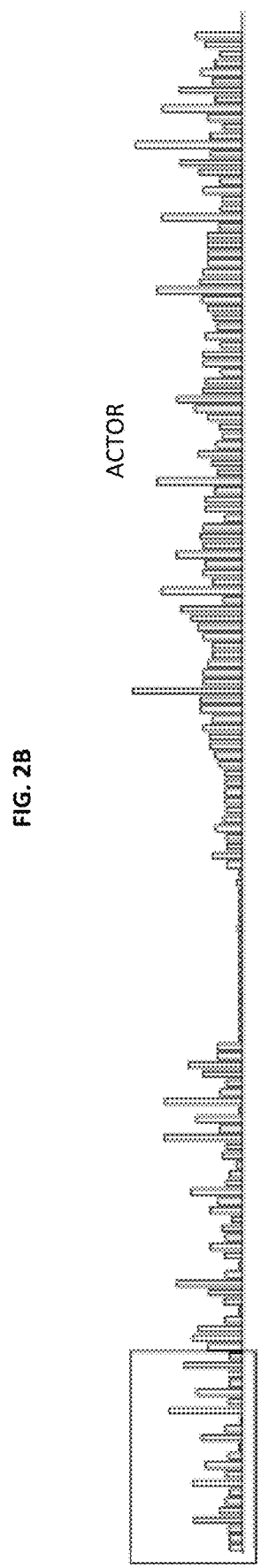

Such techniques as will be described in this disclosure can also be used with graphs such as the bar chart illustrated in FIG. 2A. The bar chart in FIG. 2B includes the actual data points within the database. Due to the large number of data points and the density of the display it is difficult to determine particular data points that may be relevant, although such a dense display remains useful to determine trends. The bar chart of FIG. 2A is the reduced resolution version of the visualization created by utilizing the teaching of the present disclosure. The bar chart of FIG. 2A can provide the user a high level profile of the data, or a window of the original data, where users can still see data patterns, but in which less data is being displayed and individual values are more discernible. For reference, the shaded portion of the bar chart of FIG. 2B is the segment or window of the lower bar chart being displayed in the upper bar chart. As with the scatter plot, a user can easily drill down in the visualization of FIG. 2B to produce the bar chart of FIG. 2A as well as to restore the original data as contained in the lower bar chart. The bar chart of FIG. 2B with the original data had 812 points. The reduced data bar chart of FIG. 2A was reduced to 406 points utilizing the teachings of the present disclosure.

Currently the primary technique used to reduce data to a manageable size for visualizations is data compression, which is the process of encoding the data to remove information that is thought to be redundant or unnecessary, thereby using fewer bits to represent the data set than used for the original representation. Similarly polynomial interpolation is also sometimes used. Although compression techniques and polynomial techniques do allow for data reduction, compression and polynomial techniques typically require significant extra processing to provide the compression and, to the extent it is even possible, similarly significant processing to restore the data to something close to its original form. In addition, with compression and polynomial techniques, the points that are considered redundant as part of the compression or interpolation processes are typically eliminated and lost, and cannot be restored without repeating the inquiries and the like that led to the original variation. Such loss degrades the analysis process of the data. Accordingly, neither of compression or polynomial techniques have been able to provide a reasonable solution to the problem of displaying large data sets while allowing the viewer to zoom in or out to a resolution that is appropriate to best understand the data being visualized.

Figure 3:
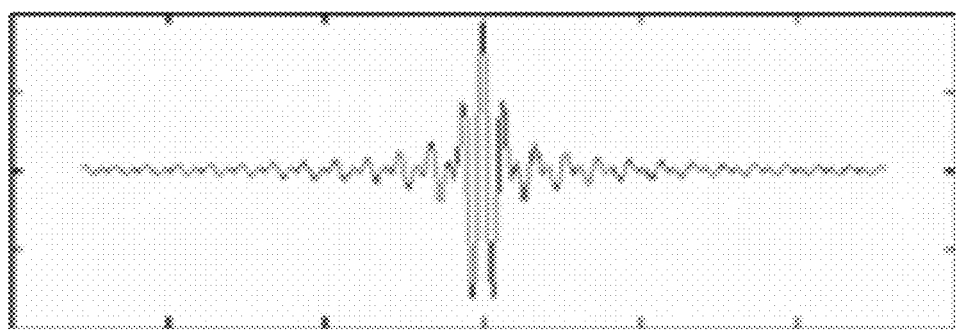
FIG. 3 is a graph illustrating an example wavelet function.

The present invention is able to achieve this zooming in and out functionality by the use of mathematical functions called wavelets. When visualized, a wavelet can be represented as a wave-like oscillation, such as the one illustrated in FIG. 3. For example, the wavelet can have an amplitude that begins at zero, increases above zero, decreases below zero, and then increases back to zero. The wavelet can be thought of as a "brief oscillation" like one might see recorded by a seismograph or heart monitor. Generally, wavelets not only have a varying amplitude but also a varying frequency. Within FIG. 3, and as will be discussed later, the width of the wavelet is equal to the wavelet's scale "s" and the position of the wavelet along the horizontal axis is equal to "T". There are multiple types and families of wavelets with varying shapes, amplitudes, frequencies and other characteristics that can be purposefully crafted to have specific properties that make them useful for signal processing. In effect the wavelets can be used to sample a signal at varying predetermined times and within varying predetermined windows, in order to facilitate the analysis of the signal in greater detail using the sampled information. However, with wavelets, the data that is not contained within a particular sampling is not lost, but rather averaged in to determine the sample values.

Figure 4:
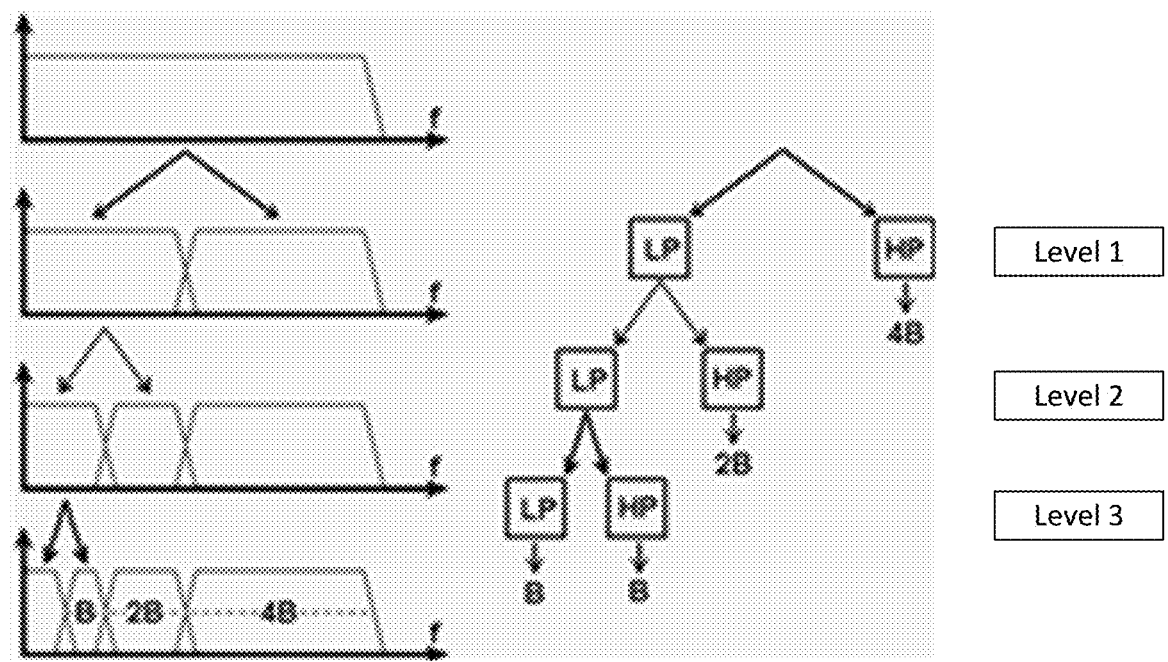
FIG. 4 is a graph illustrating a wavelet as an example family of filters.

From a functional point of view wavelets can be represented as a tree or family of filters, such as are illustrated in FIG. 4. Each level of filters can be configured to pass only the components of the input signal that have a frequency lower that a predetermined value and those which have a frequency higher than that same value. A family of filters can effectively divide a signal into a plurality of component parts that can be individually analysed and determined. It should be noted that within FIG. 4 the effect of each filter is to divide the waveform, or at least the lower frequency portion of the waveform into sub-components that collectively add to the original waveform. Some uses of waveforms can include the higher frequency in addition to or instead of the lower frequency and all of these alternatives should be considered as being within the scope of the present invention. These sub-components can be referred to as wavelet transforms. Depending upon the choice of the wavelet's parameters, the transform of a signal using wavelets can be used to reduce and to restore the original signal with minimal error and with minimal incremental processing. In the final illustration of FIG. 4 is shown four waveforms of width, B, B, 2B and 4B, which add to the width of the original waveform.

Furthermore the selection of the appropriate wavelets and the determination of the parameters for the filters used to maximize the ability to zoom in and out on the data with minimal error and processing, are also non-trivial. For example, the varying frequencies, periods, amplitudes and shapes of the Daubechies families of wavelets seem particularly suited for the techniques of the present disclosure. It is however noted that other families of wavelets and other frequencies, amplitudes, periods, shapes and other wavelet characteristics can produce similar results and are intended to be covered within the teachings of the present disclosure.

Referring now to FIG. 5 wherein is shown a typical database consisting of six fields or dimensions, namely "Type," "Engine," "Transmission," "Price," "Make," and "Model." As is typical with databases, the one illustrated in FIG. 5 has a header row 501, often referred to as including the applicable data element types. The database also has several records 502, each of which is an additional row as illustrated. Under each data element type there is an entry, referred to as a data element value 503. Each of these rows or records 502 can be given a number from 1 to N, where N is the total number of records in the database. Using the techniques of the present invention this database can be represented by an array or series of vectors, wherein "n" is the record number and Dimx[n] is the data element value 503 of a particular data element type for that record. Such a vector is illustrated below:

$$v[n]=(Dim1[n], Dim2[n] \ldots Dimx[n])$$

With respect to FIG. 5, Dim1 of the above vector refers to the data element value for field identified as "Type", Dim2 refers to the data element value for the field identified as "Engine" and so forth. It should be noted that other fields and even calculated values or measures, if applicable, can be included within the vector according to the teaching of the present disclosure. In addition if only particular values are of interest, the above vector can be simplified to include only those values.

Reference is now made to the FIG. 6 which is a table having the data element values for each record, but in which the alpha, numeric and alphanumeric values for one or more data element values within the record are replaced by a binary representation using the teachings of U.S. Pat. No. 7,058,621, which is also assigned to QlikTech International, AB, and the teachings of which are incorporated herein by reference. As previously stated, FIG. 6 can include calculated values as well as data element values for the particular dimensions of interest. Depending upon these particular interests one or more of the data element types and/or the calculated values or measures could be stated in their alpha, numeric and/or alphanumeric form. Accordingly, and depending upon the particular interest, the above vector v[n] could use either the binary, alpha, numeric and/or alphanumeric form for the Dimv[n] values, and still fall within the scope of the present invention.

Using the teachings of the present disclosure the vector v[n] referenced above, can be processed using the wavelets, to transform the vector into one or more wavelet transforms. Classic wavelet theory notation introduces the father wavelet function denoted by φ and the mother wavelet function denoted by ψ. The father wavelet can contain the low frequency fundamental information about the signal and the mother wavelet can contain the high frequency details of the signal. These functions can be chosen to be orthogonal, compliant with the momentum condition, smooth, condensed, and of limited energy in accordance with classic wavelet theory. Accordingly:

$\varphi(x) = \Sigma_n h_n \varphi(2x-n)$ is an example father wavelet and $\psi(x) = \Sigma_n g_n \varphi(2x-n)$ is an example mother wavelet In the above equations, $h_n$ and $g_n$ are coefficients chosen to be in compliance with classic wavelet theory and associated with the high pass ($h_n$) and low pass ($g_n$) characteristics of the filters referenced in FIG. 4, The symbols x and k are real numbers chosen to ensure that all of the records to be considered, are in fact considered as part of a transform. Wavelet theory states that a signal $f(x)$ can be represented using the father wavelet in accordance with the following formula:

$$f(x) = \sum_n a_n \varphi(x - n)$$

In this formula $a_n$ is a coefficient that can be determined in accordance with wavelet theory, and for most cases an equals $v_n$. Accordingly the above formula is equivalent to the vector being multiplied by the father wavelet. In another aspect, the present invention can utilize other, more complicated schemes to derive $a_n$.

In one aspect, wavelet transforms can be applied in multiple levels or iterations, such as is suggested by the filtering levels in FIG. 4. With each increasing level the wavelets can be configured to sample smaller portions of the signal and can therefore do so in more detail. If wavelet analysis is applied to function $f(x)$, accordingly to wavelet theory, the function can be represented by the following formula:

$$f(x) = \sum_n \tilde{a}_n \varphi(2x - n) + \tilde{b}_n \psi(2x - n)$$

This first level wavelet transform has been derived using the Mallat decomposition algorithm wherein:

$\tilde{a} = (a*h)\uparrow 2$ $\tilde{b} = (a*g)\uparrow 2$

In the above equations the operator * is the usual convolution operator of sequences of the real numbers:

$a = \{a_n\}$, $h = \{h_n\}$ and $g = \{g_n\}$, which are defined by:

$$(a*h)_n = \sum_t a_t h_{n-t}$$

and $$(a*g)_n = \sum_t a_t g_{n-t}$$

and the operator "↑2" means that every second value is discarded. In this equation "t" is an integer chosen to cycle the summation through all of the values of the signal being represented.

If another level of wavelet analysis is desired, according to wavelet theory, the second level or iteration can be determined using the formula:

$$f(x) = \sum_n \tilde{\tilde{a}}_n = \varphi(4x - n) + \tilde{\tilde{b}}_n \psi(4x - n) + \tilde{b}_n \psi(2x - n)$$

In this formula the new coefficients are determined as follows:

$\tilde{\tilde{a}} = (\tilde{a}*h)\uparrow 2$ $\tilde{\tilde{b}} = (\tilde{a}*g)\uparrow 2$ Accordingly, $$(\tilde{a}*h)_n = \sum_t \tilde{a}_t h_{n-t}$$

and $$(\tilde{a}*g)_n = \sum_t \tilde{a}_t g_{n-t}$$

Further levels or wavelet iterations can be derived in the same manner if desired.

In accordance with wavelet theory the second member of Daubechies wavelets can have the following values for the low pass analysis filter coefficients:

$$h_0 = \frac{1-\sqrt{3}}{4\sqrt{2}}, h_1 = \frac{-3+\sqrt{3}}{4\sqrt{2}}, h_2 = \frac{3+\sqrt{3}}{4\sqrt{2}}, h_3 = \frac{-1-\sqrt{3}}{4\sqrt{2}}$$

The values for the high pass analysis filter coefficient can be correspondingly:

$$g_0 = \frac{-1+\sqrt{3}}{4\sqrt{2}}, g_1 = \frac{3+\sqrt{3}}{4\sqrt{2}}, g_2 = \frac{3-\sqrt{3}}{4\sqrt{2}}, g_3 = \frac{1-\sqrt{3}}{4\sqrt{2}}$$

These values can be constant regardless of the level or iteration of the wavelet analysis. The above equations can be used to reduce the original vector. Comparable equations are also available to synthesize or restore the original vector. The values for the high pass and low pass filters coefficients for the synthesis equations can be as follows:

$$\tilde{h}_0 = \frac{1-\sqrt{3}}{4\sqrt{2}}, \tilde{h}_1 = \frac{-3+\sqrt{3}}{4\sqrt{2}}, \tilde{h}_2 = \frac{3+\sqrt{3}}{4\sqrt{2}}, \tilde{h}_3 = \frac{-1-\sqrt{3}}{4\sqrt{2}}$$

and $$\tilde{g}_0 = \frac{-1+\sqrt{3}}{4\sqrt{2}}, \tilde{g}_1 = \frac{3+\sqrt{3}}{4\sqrt{2}}, \tilde{g}_2 = \frac{3-\sqrt{3}}{4\sqrt{2}}, \tilde{g}_3 = \frac{1-\sqrt{3}}{4\sqrt{2}}$$

Using the reduction coefficients $h_0$ and $g_0$, the first level of wavelet transform can be calculated as follows:

$\tilde{a}_n = h_0 v[2(n-1)+4] + h_1 v[2(n-1)+3] + h_2 v[2(n-1)+2] + h_3 v[2(n-1)+1]$ and $\tilde{b}_n = g_0 v[2(n-1)+4] + g_1 v[2(n-1)+3] + g_2 v[2(n-1)+2] + g_3 v[2(n-1)+1]$ These equations are calculated for n=0, 1, 2, . . . . N/2 where N is the number of records in the database. So, for example, if n is equal to 1, or the first record, the above equations become:

$$\tilde{a}_1 = h_0 v[4] + h_1 v[3] + h_2 v[2] + h_3 v[1]$$

and $$\tilde{b}_1 = g_0 v[4] + g_1 v[3] + g_2 v[2] + g_3 v[1]$$

Since $a_n = v_n$, the above equations also define the first level wavelet transform of the signal. If it is desired to perform a second level of wavelet analysis the applicable formulas can be constructed in the same manner as set forth above, however $\tilde{a}$ becomes $\tilde{\tilde{a}}$, $\tilde{b}$ becomes $\tilde{\tilde{b}}$ and v becomes $\tilde{a}$.

Figure 8:
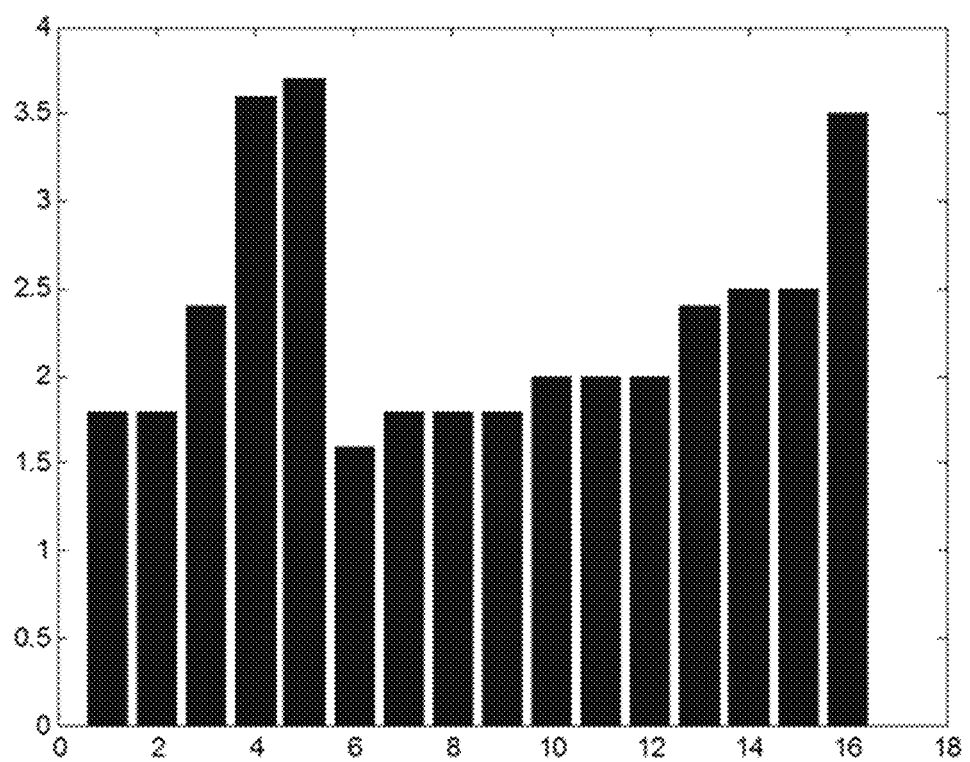
FIG. 8 is a bar chart illustrating example data.

Consider now the database of FIG. 6 for the case, as an example, when a user would like to focus on the size of the engine as it relates to the price of the vehicle. To facilitate such analysis a new table, as shown in FIG. 7, in which the binary values in the Engine data element type have been replaced with the actual numeric values for the data element values. For ease in understanding an extra column is added in FIG. 7 with the actual values while still retaining the binary values in another column. If a bar chart representation of the data is created, the bar chart would look like the bar chart in FIG. 8, where the y axis is the engines size and the x axis is the record number.

In one aspect, the same procedure for rendering can be to be applied to the reduced data set as was applied to the original data set. However, as a result of the wavelet transform, the range and zero levels of the values are typically different. To return reduced data values from the wavelet transform within the same range and zero level, the transform can be scaled in a manner known to those skilled in the art. The scaling is typically defined by the following equation:

$$V_f[n] = K * V_l[n]$$

where $$K_+ = \frac{\max(v_l)}{\max(V_l)}, \text{ with } v_l > 0$$

$$K_- = \frac{\max(v_l)}{\max(V_l)}, \text{ with } v_l < 0$$

$$K = \max(K_+, K_-)$$

Substituting the field element values for the engines within the $f(x)$ formulas for the various levels of reduction the coefficients can be calculated for whatever other levels are chosen, and the scaling factor can then be applied. The results of these calculations after scaling are represented in FIG. 9 which is a table that adds the Level calculations as new columns to the table of FIG. 7.

As shown in FIG. 9, Level 1, which is the first iteration of wavelet transform is illustrated. Records 1 through 8 represent the records passing through the low pass filter or low pass wavelet stage, and records 9 through 16 represent the records passing through the high pass filter or high pass wavelet stage. In FIG. 9 the records passing through low pass filter are illustrated in light gray shading, and those records passing through the high pass filter with no highlighting. Although records 9 through 16 need no longer be consider for purposes of the data reduction, such data is not lost since the engine values for these records were used in the calculation of the Level 1 values for the records 1 through 8. Accordingly, although it appears that the values for records 9 through 16 are lost, these values are in fact still available in the values obtained for records 1 through 8 and can be re-determined through a synthesis process.

If level 1 is the desired reduction level, it is enough to provide the values in light gray shading, as obtained from the procedure described above, to the reduced value display. If further reduction is required, another step can be applied to the data in the light gray shading, in the same manner, to reduce the values to those reflected with the darker gray shading at each subsequent level. In all cases, the values with the white or no highlight, although no longer required for the visualization of the display at that level of resolution, are kept in memory to be able to reconstruct exactly all stages during a synthesis process.

The stages of representation can be completely developed in memory and resolution and scaling adjustments made according to user inputs that are quickly computed with usual parallelisation techniques to accelerate further the computations.

Figure 10:
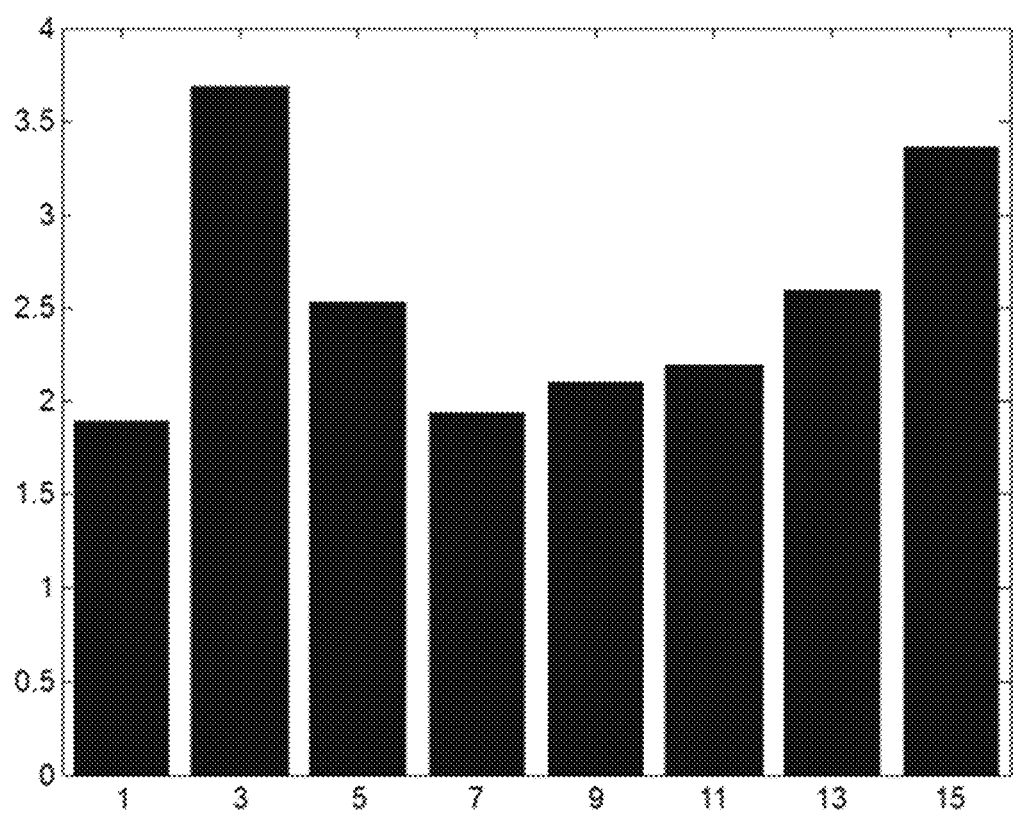
FIG. 10 is a bar chart illustrating example data.
Figure 11:
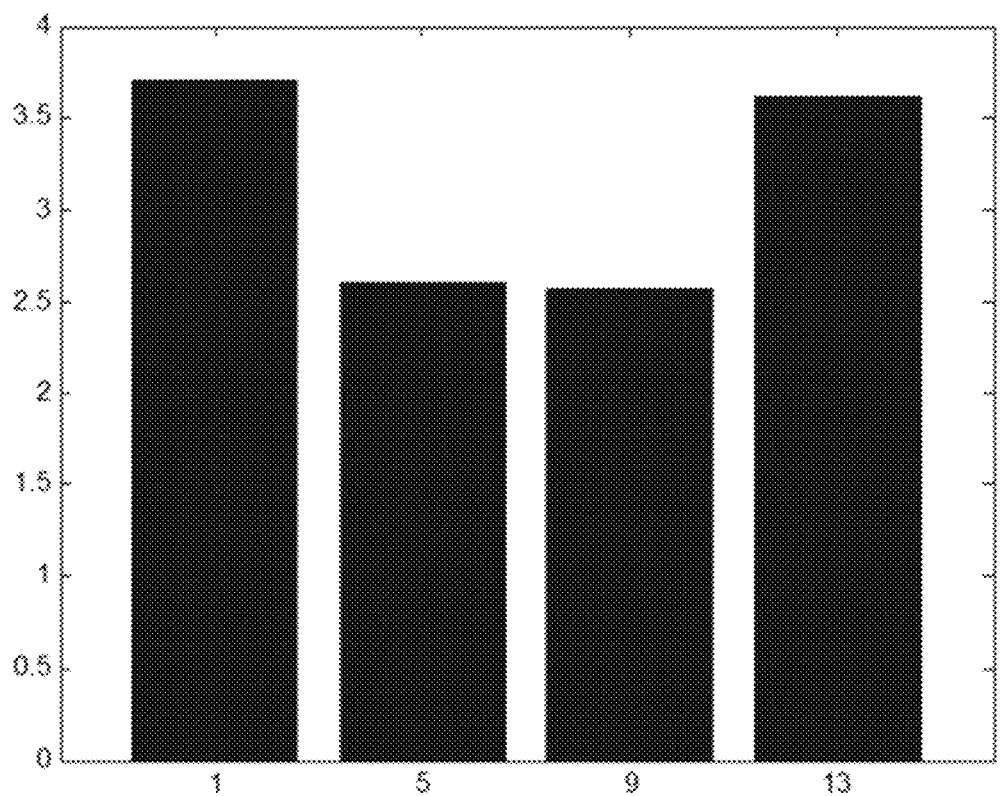
FIG. 11 is a bar chart illustrating reduced data.

A graphical representation of the bar chart for Level 1 is set forth in FIG. 10. In effect, the engine sizes have been eliminated for every other record from the bar chart although the new values include weighted averages of the values for the engine sizes that have been eliminated. Similarly the bar chart for Level 2 is illustrated in FIG. 11. Again, in effect the values for ever other record of FIG. 10 have been removed but averaged in the remaining values.

To choose the number of levels of reduction that are used the data that is to be reduced can be represented by a target number of samples M. The number of levels to reduce the data can be determined by:

$$\#L = \text{ceil}((\log(N/M)/\log(2.0)))$$

The ceil function makes sure that $N/2 <= M <= N$.

For the two dimensional data reduction of a scatter plot, the following method is used. Consider a table with two measures Measure1 and Measure2. The scatterplot concept is to plot the N points $$p[n] = (\text{Measure1}[n], \text{Measure2}[n])$$

A grid of $\sqrt{N} \times \sqrt{N}$ cells can be created. With the example database having 16 records, a grid of 4 times 4 cells can be constructed. The extent of this matrix is:

(min(Measure1),max(Measure1))×(min(Measure2), max(Measure2))

Figure 12:
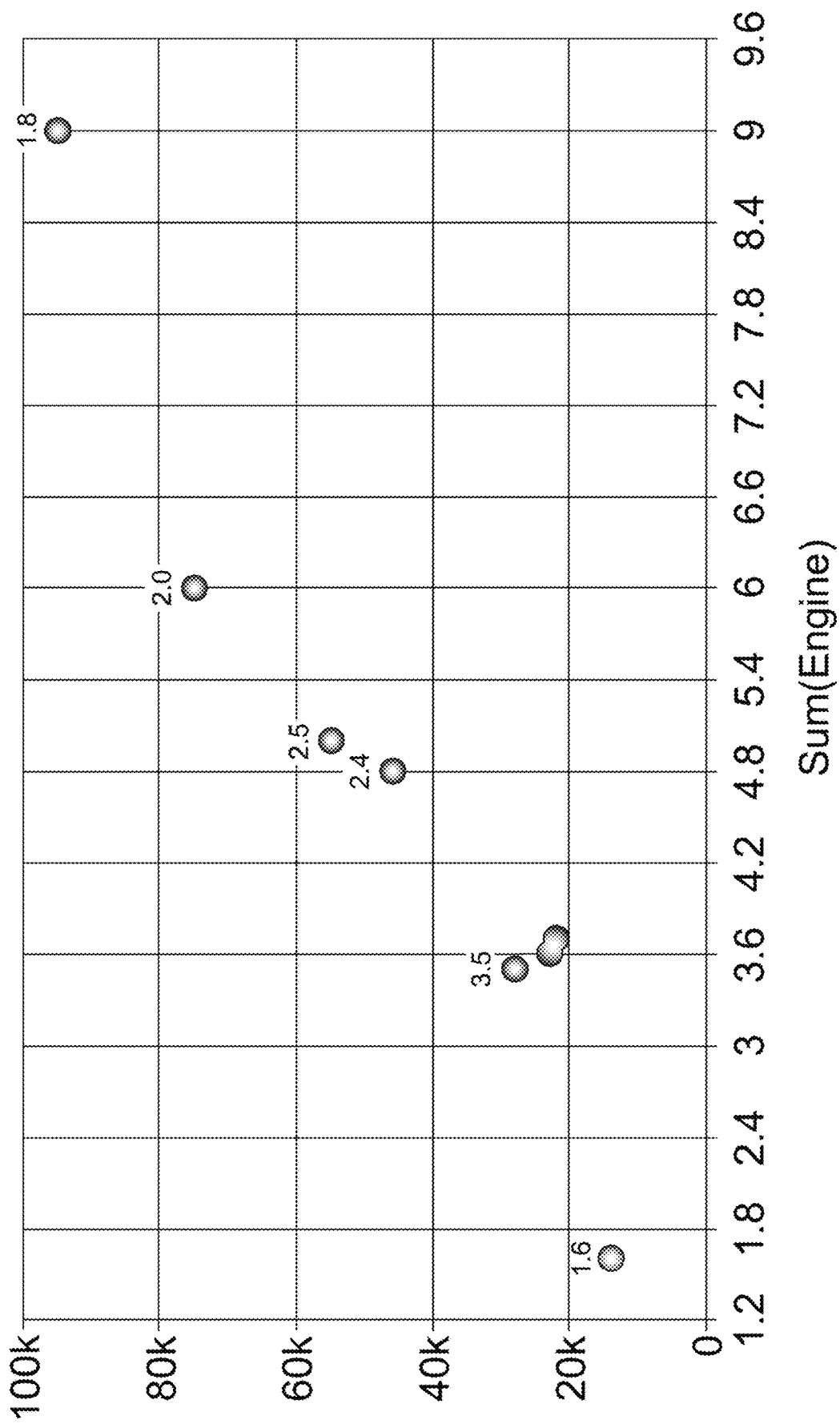
FIG. 12 is a scatter plot illustrating example data.

The representation is as depicted in FIG. 12. The following matrix can be then constructed counting the number of points hitting every cell as illustrated below:

$$M = \begin{pmatrix} 0 & 0 & 1 & 1 \\ 0 & 1 & 0 & 0 \\ 0 & 1 & 0 & 0 \\ 1 & 3 & 0 & 0 \end{pmatrix}$$

Figure 13:
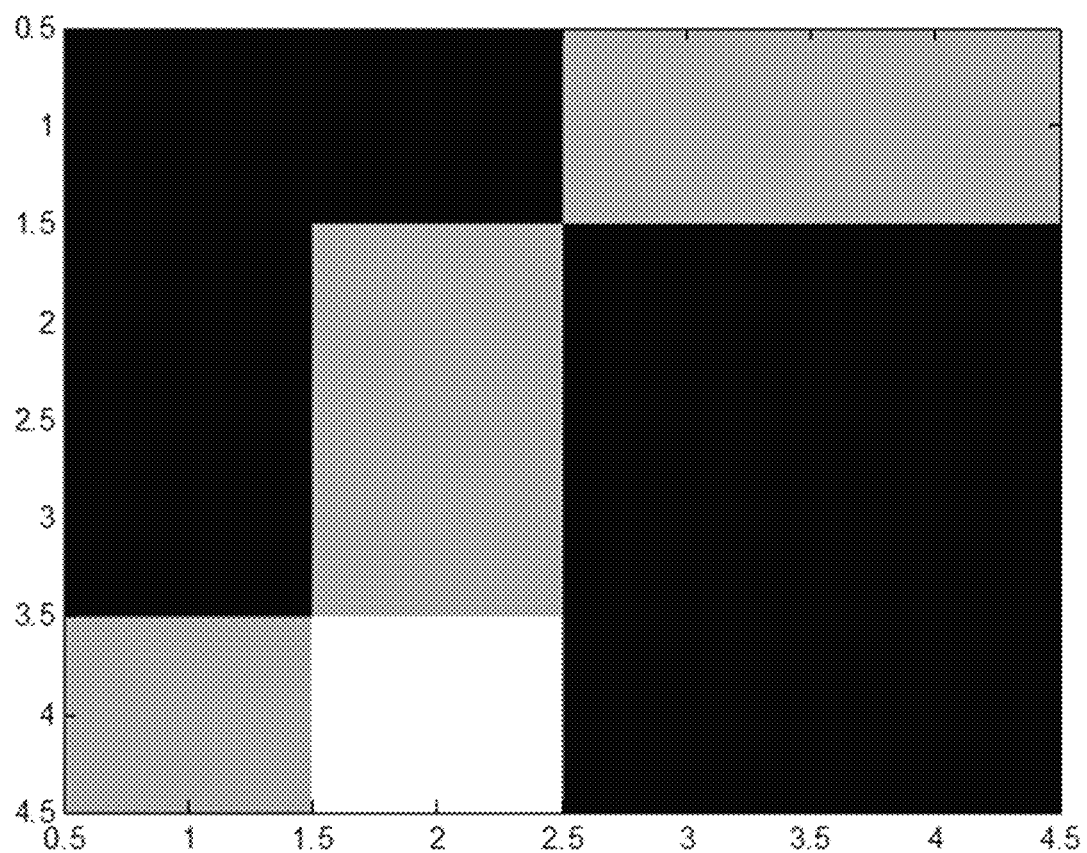
FIG. 13 is an image representation illustrating an example matrix of data.
Figure 14:
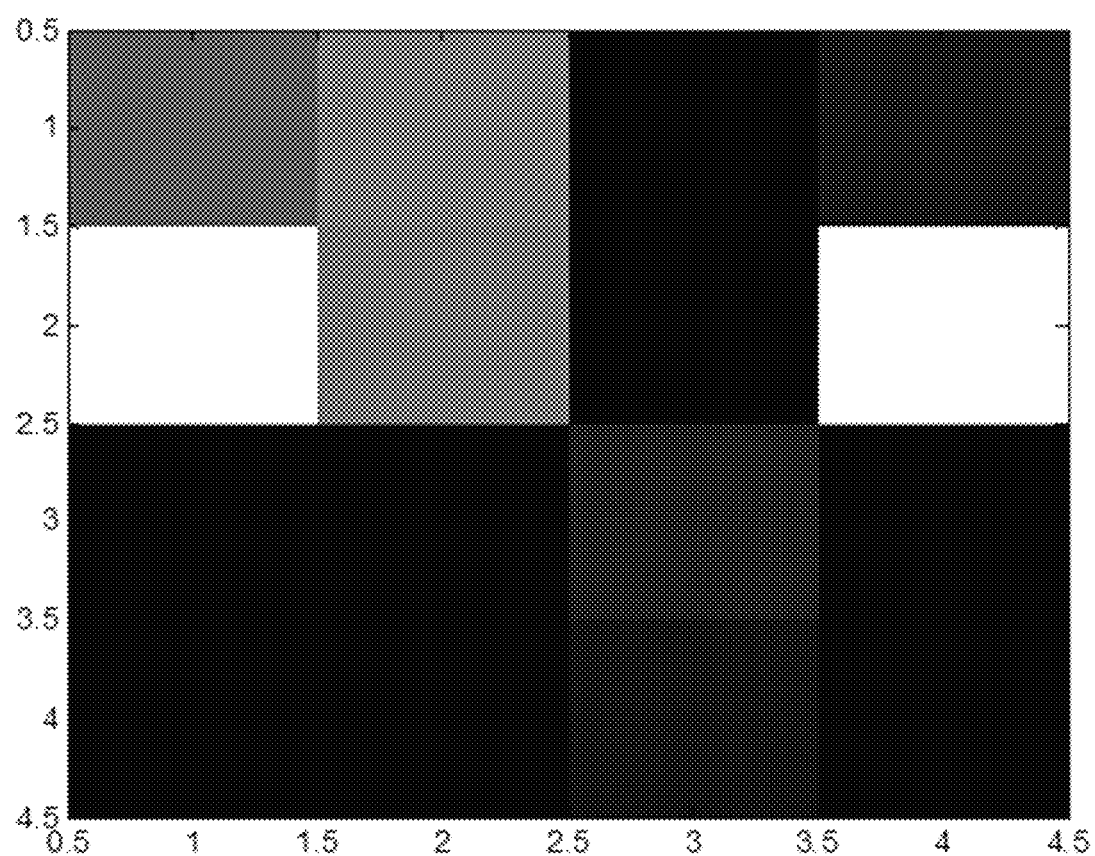
FIG. 14 is an image representation illustrating an example matrix of reduced data.

An image representation in grayscale of the matrix M is shown in FIG. 13. This matrix can be treated with a 2D wavelet transform, by applying the 1D transform column-wise and then applying the same transform row-wise to the previous result. The resulting wavelet transform as a grayscale image is depicted in FIG. 14. The 2D wavelet transform can provide a reduced data set in its first quadrant where the both the column-wise and the row-wise pass reflects the low frequency component of the signal.

As previously stated, wavelet transforms can afford not only the easy and accurate reduction of a signal, but wavelet transforms can also afford the easy and accurate reconstruction of that same signal. The step for reconstructing Level 1 out of level 2 components can be expressed by the formula:

$$\tilde{a}=(\tilde{\tilde{a}}\downarrow 2*\tilde{h})+(\tilde{\tilde{b}}\downarrow 2*\tilde{g})$$

Subsequently, the next step, reconstructing from Level 1 to the signal can be expressed by the following formula:

$$a=(\tilde{a}\uparrow 2*\tilde{h})+(\tilde{b}\uparrow 2*\tilde{g})$$

Where the up sampling operator (↑2) inserts zeros every second place and the convolution operator is applied as defined above. The coefficients of the father wavelet "ã" and mother wavelet "b̃" are therefore sampled up and rescaled to match up the level. The low pass and high pass parts of the signal can be filtered and combined to reconstruct exactly the original sequence "a". The equations for Level 2 to level 1 can be as follows:

$$\tilde{a}[2n]=\tilde{h}_1\tilde{\tilde{a}}_{n+1}+\tilde{h}_3\tilde{\tilde{a}}_{n-1}+\tilde{g}_1\tilde{\tilde{b}}_{n+1}+\tilde{g}_3\tilde{\tilde{b}}_{n-1}$$

$$\tilde{a}[2n+1]=\tilde{h}_0\tilde{\tilde{a}}_{n+2}+\tilde{h}_2\tilde{\tilde{a}}_n+\tilde{g}_0\tilde{\tilde{b}}_{n+2}+\tilde{g}_2\tilde{\tilde{b}}_n$$

For Level 1 to original signal the equations can be:

$$v[2n]=\tilde{h}_1\tilde{a}_{n+1}+\tilde{h}_3\tilde{a}_{n-1}+\tilde{g}_1\tilde{b}_{n+1}+\tilde{g}_3\tilde{b}_{n-1}$$

$$v[2n+1]=\tilde{h}_0\tilde{a}_{n+2}+\tilde{h}_2\tilde{a}_n+\tilde{g}_0\tilde{b}_{n+2}+\tilde{g}_2\tilde{b}_n$$

In both cases for n=0, 1, 2, . . . . N/2.

Utilizing the above techniques it is possible to easily and accurately zoom and zoom out of a visualization with complete accuracy and with minimal incremental processing. From the point of view of a user implementing these techniques there are multiple options for a user interface. Although various approaches may be utilized, all are intended to be incorporated into the scope of the present disclosure. For example in one embodiment the user may enter a required number of data points for the reduced dataset through objects such as actual data entry, drop down boxes, sliders, switches and so forth. Similarly default values for the reduction rate can be pre-programmed and actuated by clicking on an object, mousing over an object or otherwise selecting an object or a portion of an object by lassoing or other techniques.

Figure 15A:
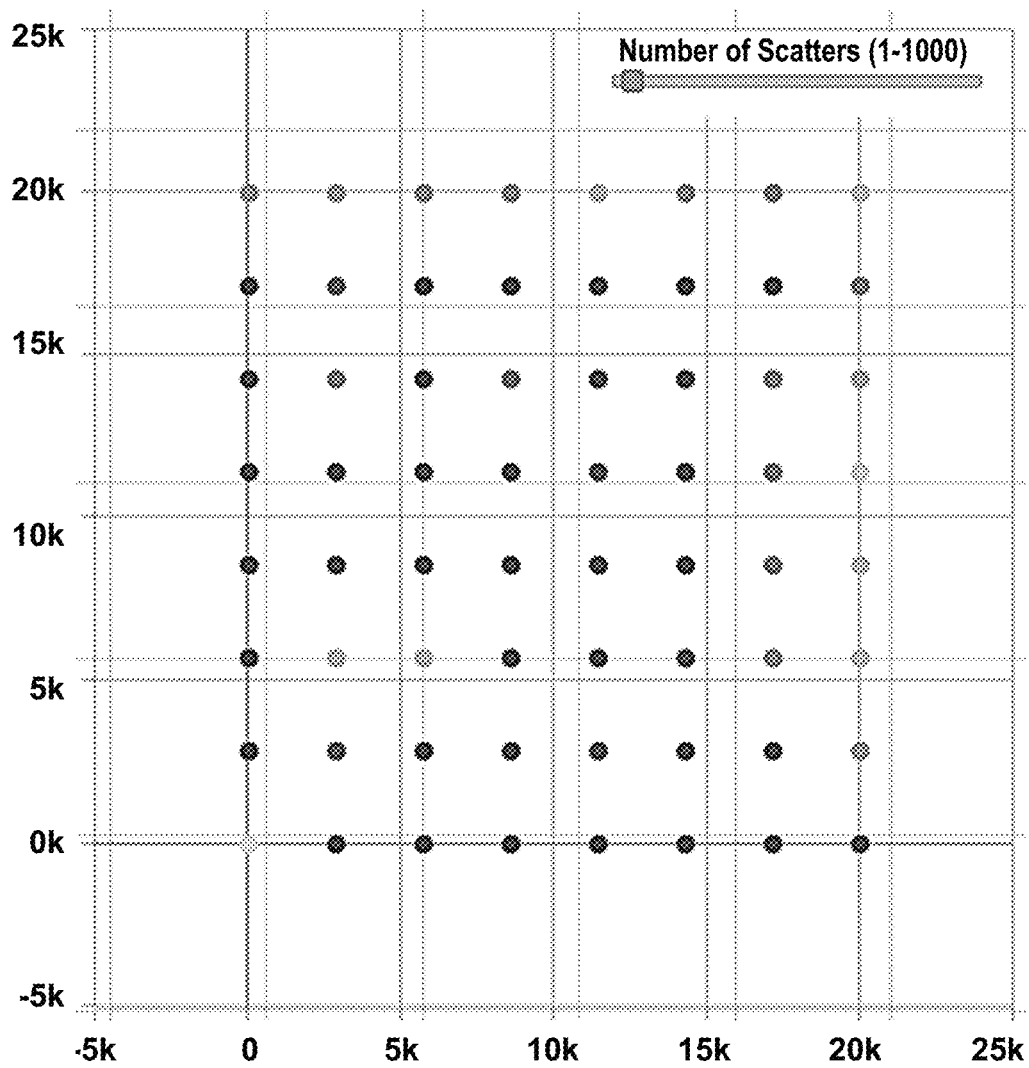
FIG. 15A is an image representation illustrating example data.
Figure 15B:
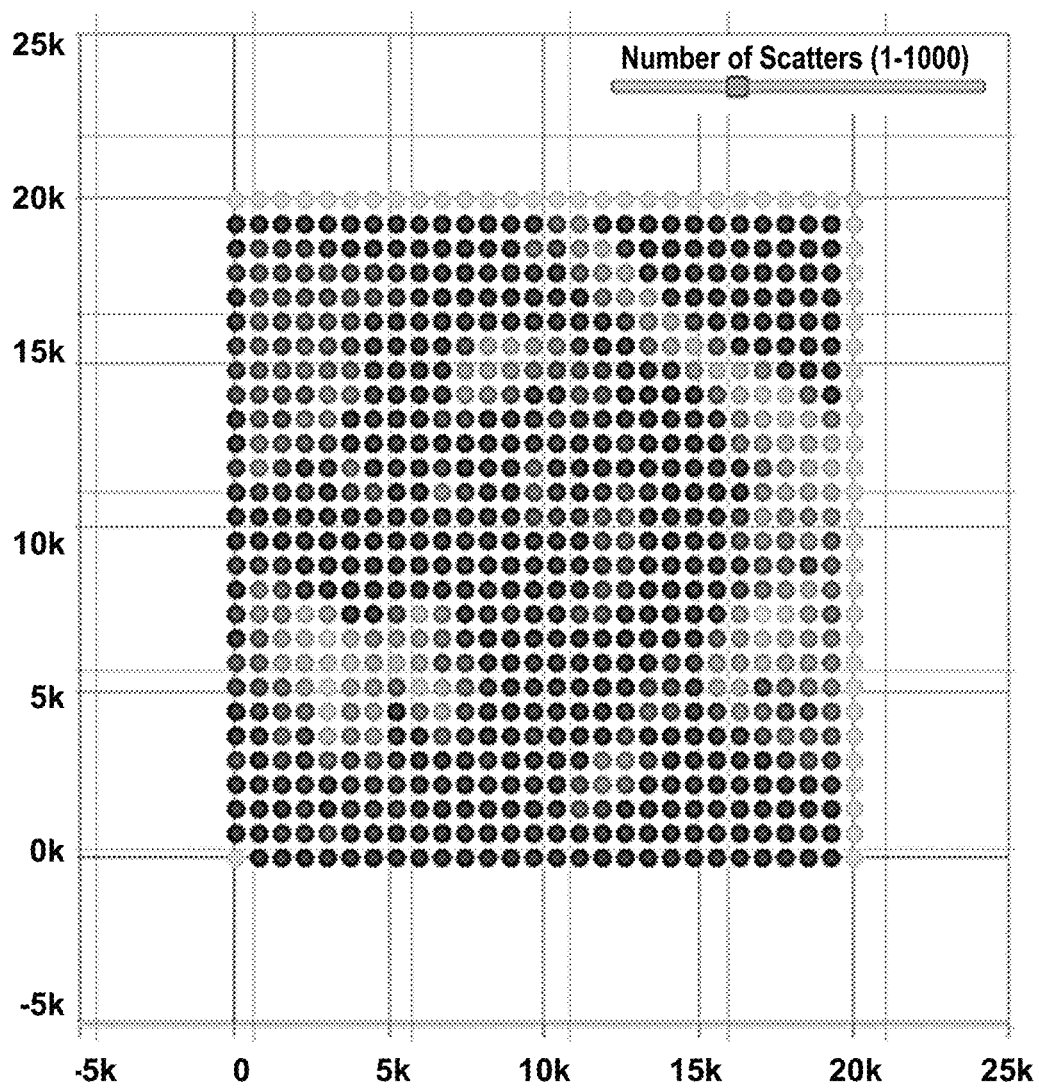
FIG. 15B is an image representation illustrating example expanded data.
Figure 15C:
FIG. 15C is an image representation illustration another example of expanded data.

As an illustration of the above user interface techniques, FIGS. 15A through 15C illustrate a scatter plot such as the picture previously illustrated in FIG. 1A and FIG. 1B. Within these illustrations slider is made available as part of the visualization to control the detail level. Typically the first step is to present fewer points and then if the information is not enough, the user can adjust the slider for more data.

Figure 16:
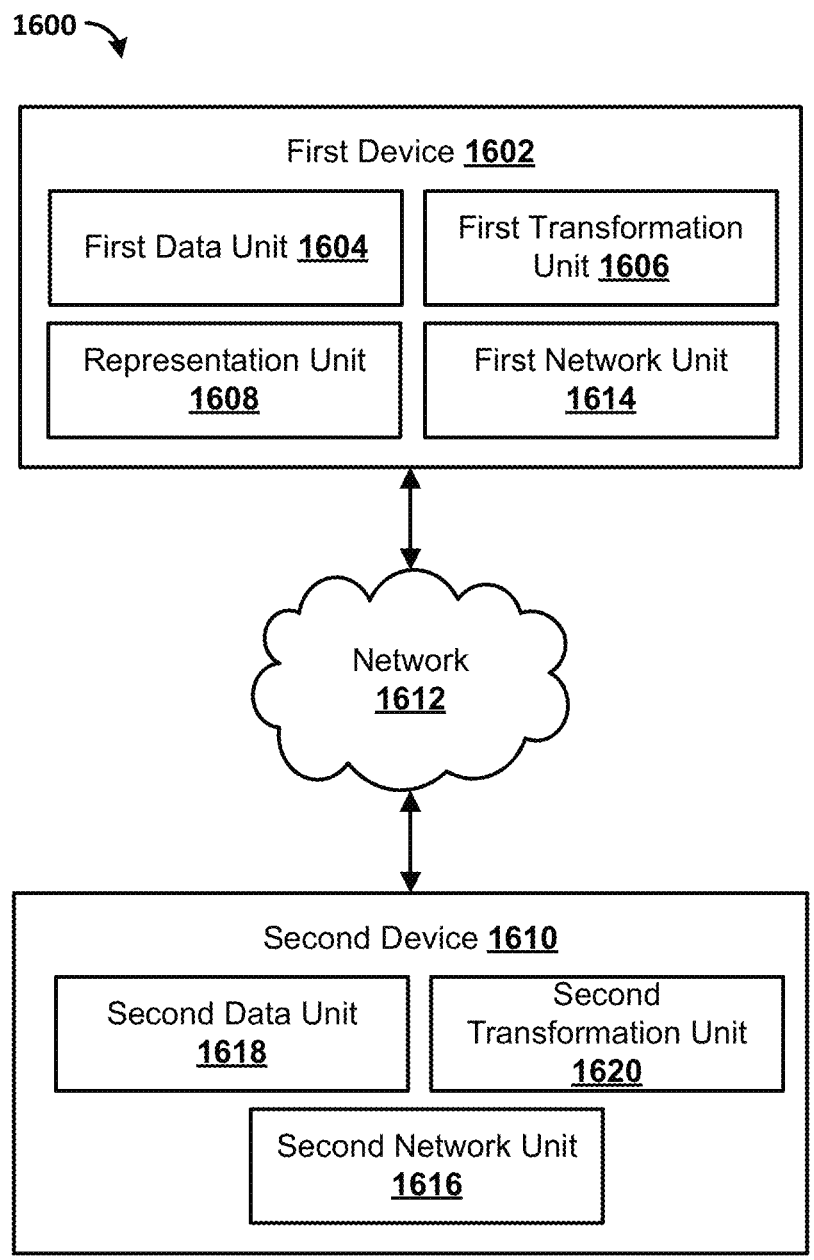
FIG. 16 is a block diagram illustrating an example system for representing data.

FIG. 16 is a block diagram illustrating an example system 1600 for representing data. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In one aspect, the system 1600 can comprise a first device 1602. The first device 1602 can be configured to receive data from a remote source and/or user. For example, the first device 1602 can comprise a first data unit 1604 configured to receive, store, update, and otherwise manage data. In one aspect, the first data unit 1604 can comprise a data structure, such as a database. The data structure can comprise a plurality of data values organized as data records. In one aspect, the data values can be the original data values or can be data values that have been transformed according to one or more transformation algorithms.

In one aspect, the first device 1602 can comprise a first transformation unit 1606 configured to transform data. For example, the first transformation unit 1606 can be configured to reduce or expand data based on one or more wavelet functions. For example the first transformation unit 1606 can be configured to apply a wavelet transform and/or inverse wavelet transform to the data according the techniques described herein. For example, the first transformation unit 1606 can be configured to convert the data into a plurality of vectors (e.g., one vector for every database record). The first transformation unit 1606 can be configured to determine one or more coefficients, wavelet functions, and/or wavelet function parameters based on the data and the desired transformation.

In one aspect, the first device 1602 can comprise a representation unit 1608 configured to represent the data. In one aspect, the representation unit 1608 can provide a control or other user input button allowing a user to select the resolution of data represented. For example, the user can provide input requesting a reduced (e.g., lower resolution) representation of the data. As another example, the user can provide input requesting an expanded (e.g., higher resolution) representation of the data. In response to the request, the representation unit 1608 can obtain transformed data from the first transformation unit 1606.

In one aspect, the system 1600 can comprise a second device 1610 configured to communicate with the first device 1602 through a network 1612. The network 1612 can comprise network adapters, switches, routers, and the like connected through wireless links (e.g., radio frequency, satellite) and/or physical links (e.g., fiber optic cable, coaxial cable, Ethernet cable). In one aspect, the network 1612 can be configured to provide communication from telephone, cellular, modem, and/or other electronic devices to and throughout the system 1600. For example, the first device 1602 can comprise a first network unit 1614 configured to receive and transmit data across the network 1612. The second device 1610 can comprise a second network unit 1616 configured to receive and transmit data across the network 1612.

In one aspect, the second device 1610 can comprise a second data unit 1618 configured to store data. In one aspect, the second data unit 1618 can comprise a data structure, such as a database. The data structure can comprise a plurality of data values organized as data records. In one aspect, the data values can be the original data values or can be data values that have been transformed according to one or more transformation algorithms.

In one aspect, the second device 1610 can comprise a second transformation unit 1620 configured to transform data. For example, the second transformation unit 1620 can be configured to reduce or expand data based on one or more wavelet functions. For example the first transformation unit 1620 can be configured to apply a wavelet transform and/or inverse wavelet transform to the data according the techniques described herein. For example, the second transformation unit 1620 can be configured to convert the data into a plurality of vectors (e.g., one vector for ever database record). The second transformation unit 1620 can be configured to determine one or more coefficients, wavelet functions, and/or wavelet function parameters based on the data and the desired transformation.

As an illustration, the second network unit 1616 can be configured to receive a request from the first device 1602 for data. In response, the second transformation unit 1620 can be configured to transform data, such as reducing data. The second network device 1610 can be configured to provide the reduced data to the first device 1602. After the first device 1602 receives the reduced data, the first device 1602 can request an expanded version of the reduced data. For example, a user at the first device 1602 can request a higher resolution of data than the reduced data. In one aspect, the request for data from the first device 1602 can specify the level of resolution of the data. Additional transformations from the second transformation unit 1620 can be utilized to convert data to one or more resolutions for consumption by a user at the first device 1602.

Figure 17:
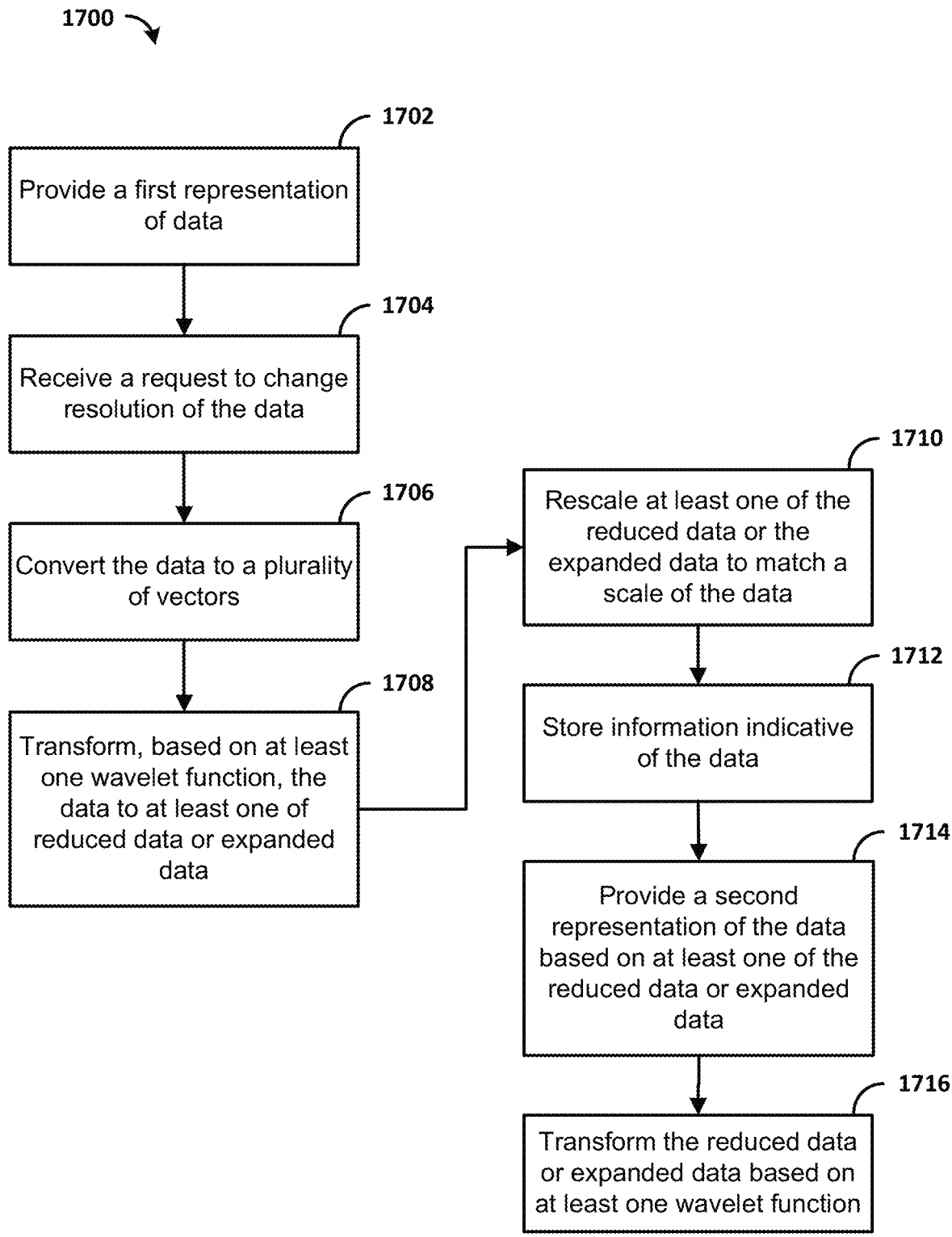
FIG. 17 is a flowchart illustrating an example method for representing data.

FIG. 17 is a flow chart illustrating an example method 1700 for representing data. At step 1702, a first representation of data can be provided. For example, a graph, bar chart, picture, or other depiction of data can be provided. At step 1704, a request can be received to change resolution of the data. For example, a user can request to see a more detailed or less detailed representation of the data. The user can request to change resolution based on a zoom or refinement tool. For example, a portion of the data (e.g. or representation thereof) can be selected, and the user can request to zoom in on the selected portion.

At step 1706, the data can be converted to a plurality of vectors. For example, the data can be converted from a plurality of database records to the plurality of vectors. As a further example, each vector can comprise a row of a database. An example vector can comprise a list, array, collection or other group of data values from a particular database record.

At step 1708, the data can be transformed, based on at least one wavelet function, to at least one of reduced data or expanded data. For example, the at least one wavelet function can comprise a Daubechies wavelet function, mother wavelet function, father wavelet function, low pass wavelet function, high pass wavelet function, or other wavelet function. In one aspect, transforming, based on at least one wavelet function, the data to the expanded data can comprise performing an inverse wavelet transform to the data. In another aspect, transforming, based on at least one wavelet function, the data to at least one of the reduced data or the expanded data can comprise averaging first portions of the data with corresponding second portions of the data and selecting a result of the averaging as the reduced data set. For example, the first portions can be every nth (e.g., second, third, fourth, fifth) data value of the data, and the second portions can be some or all of the remaining data values. In yet another aspect, transforming the data based on the at least one wavelet function can comprise multiplying at least one wavelet function by a corresponding coefficient. The corresponding coefficient can be based on the data. For example, the corresponding coefficient can based on only a portion of the data (e.g., as few as four values from the data).

At step 1710, at least one of the reduced data or the expanded data can be resealed to match a scale of the data. For example, step 1708 may, in some cases, change the scale of the data to a different scale for the reduced data or expanded data. At step 1712, information indicative of the data can be stored. The information can be a result of the transformation. For example, the information can comprise data resulting from a high pass wavelet function (e.g., mother wavelet function). At step 1714, a second representation of the data can be provided based on at least one of the reduced data or expanded data. The second representation can comprise a graph, chart, picture, or other type of representation.

At step 1716, the reduced data or expanded data can be transformed, based on at least one wavelet function, to at least one of reduce or expand the reduced data or the expanded data. For example, expanding the reduced data can comprise restoring the data based on the reduced data and the information indicative of the data.

Figure 18:
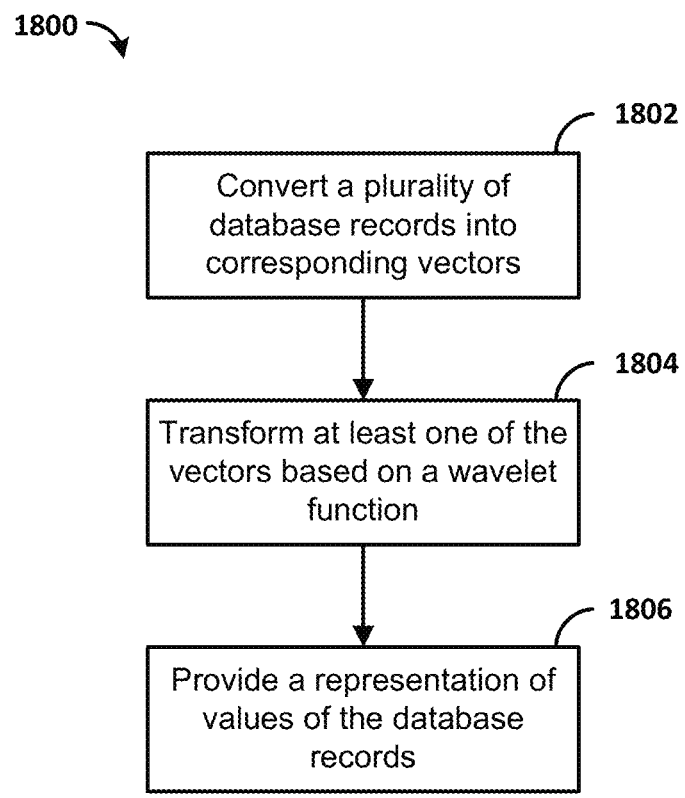
FIG. 18 is a flowchart illustrating another example method for representing data.

FIG. 18 is a flow chart illustrating another example method 1800 for representing data. At step 1802, a plurality of database records can be converted into corresponding vectors. For example, a first vector of the corresponding vectors can be representative of a first database record of the plurality of database records, and the first vector can comprises values of the first database record. As a further example, each vector can comprise a row of a database. An example vector can comprise a list, array, collection or other group of data values from a particular database record.

At step 1804, at least one of the vectors can be transformed based on a wavelet function. For example, the at least one wavelet function can comprise a Daubechies wavelet function, mother wavelet function, father wavelet function, low pass wavelet function, high pass wavelet function, or other wavelet function.

In one aspect, transforming the at least one of the vectors based on the wavelet function can comprise performing an inverse wavelet transform to the at least one of the vectors. In another aspect, transforming the at least one of the vectors based on a wavelet function can comprise determining a coefficient based on a vector of the at least one of the vectors and multiplying the wavelet function by the coefficient. For example, determining the coefficient based on the vector of the at least one of the vectors can comprise determining a result of a convolution operator applied to a first coefficient and a second coefficient. The first coefficient can be based on a value of the vector.

At step 1806, a representation of values of the database records can be provided based on a result of step 1804. In one aspect, providing the representation of values of the database records based on the result of step 1804 can comprise resealing the transformed at least one vector to match a scale of the vectors before transformation.

Figure 19:
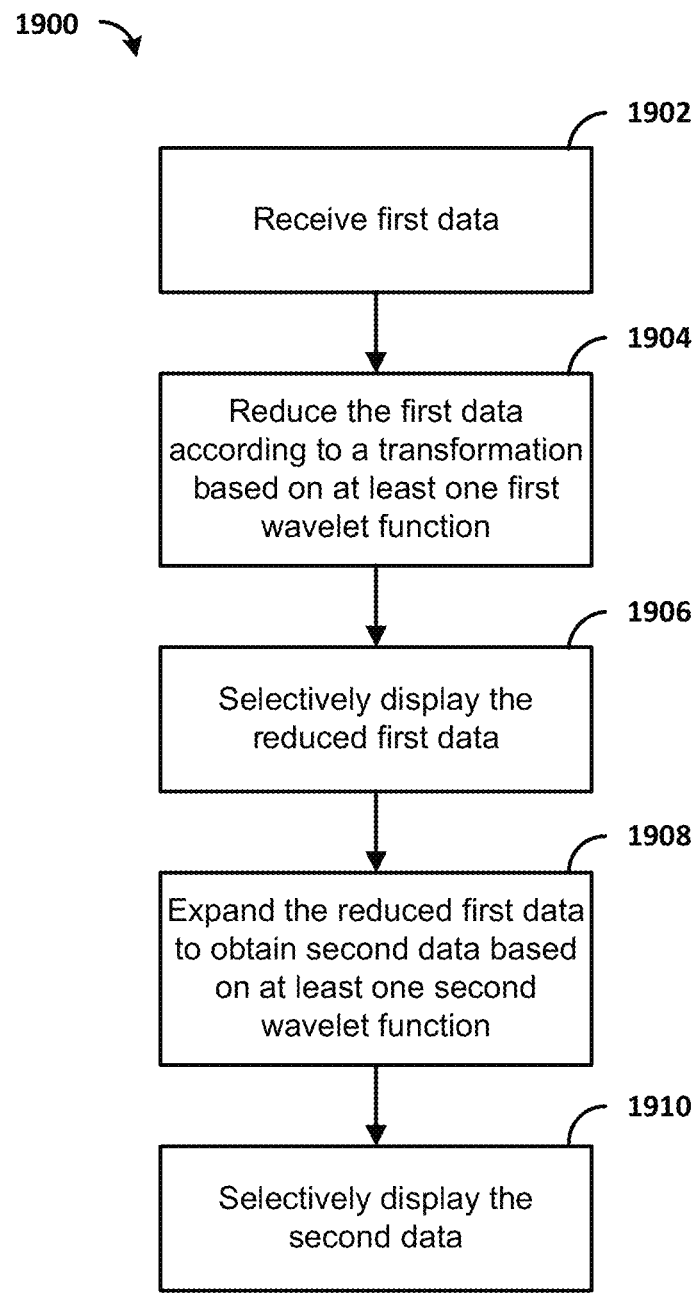
FIG. 19 is a flowchart illustrating yet another example method for representing data.

FIG. 19 is a flowchart illustrating yet another example method 1900 for representing data. At step 1902, first data can be received. In one aspect, receiving the first data can comprise selecting a portion of displayed data. The first data can comprise values from a plurality of database records. For example, receiving the first data can comprise representing the database records. In one aspect, the first data can be converted to a plurality of vectors. Each vector can comprise a row of a database, or a database record. An example vector can comprise a list, array, collection or other group of data values from a particular database record.

At step 1904, the first data (e.g., formatted as vectors) can be reduced according to a transformation based on at least one first wavelet function. For example, the wavelet function can comprise a Daubechies wavelet function, mother wavelet function, father wavelet function, low pass wavelet function, high pass wavelet function, or other wavelet function.

At step 1906, the reduced first data can be selectively displayed. In one aspect, selectively displaying the reduced data can comprise providing a control configured to select an amount of at least one of reduction or expansion (e.g., resolution) of the first data.

At step 1908, the reduced first data can be expanded to obtain second data based on at least one second wavelet function. In one aspect, expanding the reduced first data to obtain the second data based on at least one second wavelet function can comprise multiplying a wavelet function of the at least one second wavelet functions by a corresponding coefficient. The corresponding coefficient can be based on the reduced first data. In another aspect, expanding the reduced first data to obtain the second data based on at least one second wavelet function can comprise performing an inverse wavelet transform to the reduced first data. The at least one second wavelet function can comprise a Daubechies wavelet function, mother wavelet function, father wavelet function, low pass wavelet function, high pass wavelet function, or other wavelet function. As an example, the at least one second wavelet function can comprise the same function as the at least one first wavelet function but with different parameters and/or multiplied by a different coefficient.

At step 1910, the second data can be selectively displayed. For example, some or all of the second data can be displayed. In one aspect, selectively displaying the second data can comprise providing a control configured to select an amount of at least one of reduction or expansion (e.g., resolution) of the first data and/or second data.

Figure 20:
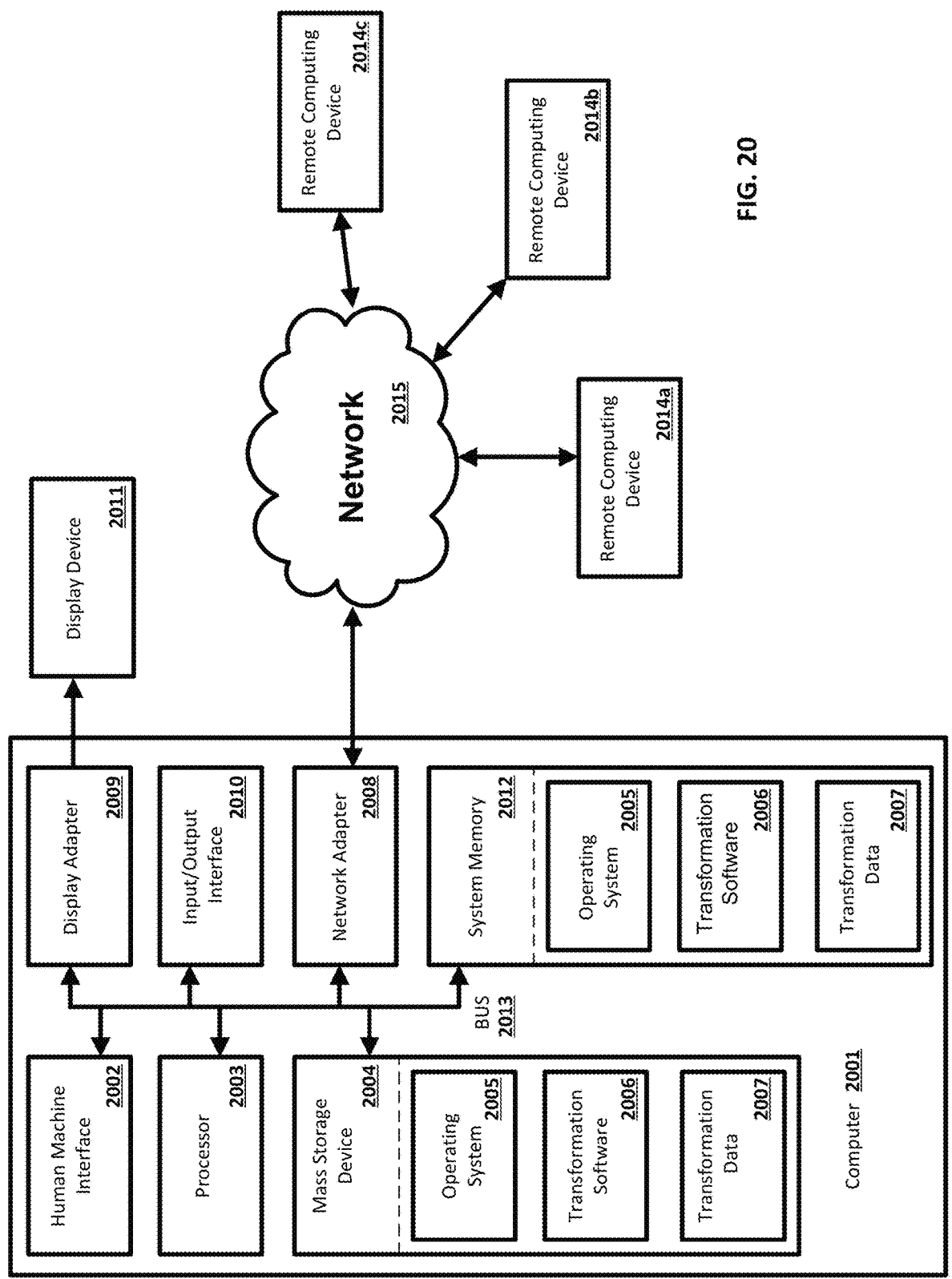
FIG. 20 is a block diagram illustrating an example computing system in which the present methods and systems can operate.

In an exemplary aspect, the methods and systems can be implemented on a computer 2001 as illustrated in FIG. 20 and described below. By way of example, the first device 1602 and/or second device 1610 of FIG. 16 can be a computer as illustrated in FIG. 20. Similarly, the methods and systems disclosed can utilize one or more computers to perform one or more functions in one or more locations. FIG. 20 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 2001. The components of the computer 2001 can comprise, but are not limited to, one or more processors or processing units 2003, a system memory 2012, and a system bus 2013 that couples various system components including the processor 2003 to the system memory 2012. In the case of multiple processing units 2003, the system can utilize parallel computing.

The system bus 2013 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 2013, and all buses specified in this description can also be implemented over a wired or wireless network connection and each of the subsystems, including the processor 2003, a mass storage device 2004, an operating system 2005, transformation software 2006, transformation data 2007, a network adapter 2008, system memory 2012, an Input/Output Interface 2010, a display adapter 2009, a display device 2011, and a human machine interface 2002, can be contained within one or more remote computing devices 2014$a,b,c$ at physically separate locations, connected through buses of this form, in effect implementing a fully distributed system.

The computer 2001 typically comprises a variety of computer readable media. Exemplary readable media can be any available media that is accessible by the computer 2001 and comprises, for example and not meant to be limiting, both volatile and non-volatile media, removable and non-removable media. The system memory 2012 comprises computer readable media in the form of volatile memory, such as random access memory (RAM), and/or non-volatile memory, such as read only memory (ROM). The system memory 2012 typically contains data such as transformation data 2007 and/or program modules such as operating system 2005 and transformation software 2006 that are immediately accessible to and/or are presently operated on by the processing unit 2003.

In another aspect, the computer 2001 can also comprise other removable/non-removable, volatile/non-volatile computer storage media. By way of example, FIG. 20 illustrates a mass storage device 2004 which can provide non-volatile storage of computer code, computer readable instructions, data structures, program modules, and other data for the computer 2001. For example and not meant to be limiting, a mass storage device 2004 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2004, including by way of example, an operating system 2005 and transformation software 2006. Each of the operating system 2005 and transformation software 2006 (or some combination thereof) can comprise elements of the programming and the transformation software 2006. Transformation data 2007 can also be stored on the mass storage device 2004. Transformation data 2007 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 2001 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 2003 via a human machine interface 2002 that is coupled to the system bus 2013, but can be connected by other interface and bus structures, such as a parallel port, game port, an IEEE 1394 Port (also known as a Firewire port), a serial port, or a universal serial bus (USB).

In yet another aspect, a display device 2011 can also be connected to the system bus 2013 via an interface, such as a display adapter 2009. It is contemplated that the computer 2001 can have more than one display adapter 2009 and the computer 2001 can have more than one display device 2011. For example, a display device can be a monitor, an LCD (Liquid Crystal Display), or a projector. In addition to the display device 2011, other output peripheral devices can comprise components such as speakers (not shown) and a printer (not shown) which can be connected to the computer 2001 via Input/Output Interface 2010. Any step and/or result of the methods can be output in any form to an output device. Such output can be any form of visual representation, including, but not limited to, textual, graphical, animation, audio, tactile, and the like. The display 2011 and computer 2001 can be part of one device, or separate devices.

The computer 2001 can operate in a networked environment using logical connections to one or more remote computing devices 2014a,b,c. By way of example, a remote computing device can be a personal computer, portable computer, smartphone, a server, a router, a network computer, a peer device or other common network node, and so on. Logical connections between the computer 2001 and a remote computing device 2014a,b,c can be made via a network 2015, such as a local area network (LAN) and/or a general wide area network (WAN). Such network connections can be through a network adapter 2008. A network adapter 2008 can be implemented in both wired and wireless environments. Such networking environments are conventional and commonplace in dwellings, offices, enterprise-wide computer networks, intranets, and the Internet.

For purposes of illustration, application programs and other executable program components such as the operating system 2005 are illustrated herein as discrete blocks, although it is recognized that such programs and components reside at various times in different storage components of the computing device 2001, and are executed by the data processor(s) of the computer. An implementation of transformation software 2006 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An apparatus comprising:
one or more processors; and
memory storing processor executable instructions that, when executed by the one or more processors, cause the apparatus to:
provide, at a user interface, a first graph representing a relationship between at least two data element types of a first selection of a plurality of database records, wherein the plurality of database records comprises data values for corresponding data element types;
convert the data values of the plurality of database records into corresponding vectors, wherein each corresponding vector comprises data values of a row of the first selection of the plurality of database records for each of the at least two data element types;
determine an amount of change in a resolution of the first graph, based on a request received at the user interface to:
reduce the first selection, or
expand the first selection;
transform, based on the determined amount of change and a wavelet function, at least one of the corresponding vectors to one of reduced data or expanded data, wherein the reduced data comprises a portion of the first selection, and wherein the expanded data comprises the first selection and at least one additional database record;

provide, at the user interface, a second graph representing a relationship between the at least two of the data element types based on the transformed at least one of the corresponding vectors;

store information indicative of the at least one of the corresponding vectors in memory, wherein the information is a result of the transformation; and restore, based on the information indicative of the at least one of the corresponding vectors, the first selection.

2. The apparatus of claim 1, wherein the processor executable instructions that cause the apparatus to transform the at least one of the corresponding vectors based on the wavelet function further cause the apparatus to perform an inverse wavelet transform to the at least one of the corresponding vectors.

3. The apparatus of claim 1, wherein the processor executable instructions that cause the apparatus to provide the second graph further cause the apparatus to rescale the transformed at least one of the corresponding vectors to match a scale of the at least one of the corresponding vectors before transformation.

4. The apparatus of claim 1, wherein the processor executable instructions that cause the apparatus to transform the at least one of the corresponding vectors based on the wavelet function further cause the apparatus to:

determine a coefficient based on a vector of the at least one of the corresponding vectors; and multiply the wavelet function by the coefficient.

5. An apparatus comprising:
one or more processors; and
memory storing processor executable instructions that, when executed by the one or more processors, cause the apparatus to:

provide, at a user interface, a first graph representing a relationship between at least two data element types of a first selection of a plurality of database records, wherein the plurality of database records comprises data values for corresponding data element types;

reduce the first selection of the plurality of database records according to a transformation based on at least one first wavelet function and an amount of change in a resolution of the first graph;

store information indicative of the first selection in memory, wherein the information is a result of the transformation;

display, at the user interface, the reduced first selection comprising a second graph representing a relationship between at least two of the data element types based on the reduced first selection, wherein the user interface is configured to transition between displaying the reduced first selection and displaying the first selection in response to a selection, at the user interface, of a resolution level of the second graph; and restore the first selection based on the information indicative of the first selection.

6. The apparatus of claim 5, wherein the processor executable instructions that cause the apparatus to display the reduced first selection further cause the apparatus to provide, at the user interface, a control configured to select the resolution level of the second graph.

7. The apparatus of claim 5, wherein the processor executable instructions further cause the apparatus to:

expand the reduced first selection to obtain a second selection of the plurality of database records based on at least one second wavelet function; and display the second selection at the user interface.

8. The apparatus of claim 7, wherein the processor executable instructions that cause the apparatus to expand the reduced first selection to obtain the second selection further cause the apparatus to at least one of:

multiply a wavelet function of the at least one second wavelet function by a corresponding coefficient, and wherein the corresponding coefficient is based on the reduced first selection; or perform an inverse wavelet transform to the reduced first selection.

9. An apparatus comprising:
one or more processors; and
memory storing processor executable instructions that, when executed by the one or more processors, cause the apparatus to:

receive, via a user interface, a request to transform a first graph, wherein the first graph is based on a portion of a plurality of database records, and wherein the request is indicative of a first quantity of the portion of the plurality of database records to be displayed;

determine, based on the first quantity indicated by the request, and based on a total quantity of the plurality of database records, a quantity of transformation levels to be applied to the first graph;

transform, based on the quantity of transformation levels and at least one wavelet function, the first graph; and provide, at the user interface, based on the transformed first graph, a second graph comprising the first quantity of the portion of the plurality of database records.

10. The apparatus of claim 9, wherein the request comprises a request to increase a resolution of the first graph, and wherein the processor executable instructions that cause the apparatus to determine the quantity of transformation levels further cause the apparatus to determine, based on a ceiling function, the quantity of transformation levels, wherein the ceiling function comprises a ratio of the total quantity to the first quantity.

11. The apparatus of claim 9, wherein at least one of: the quantity of transformation levels comprises a maximum that is less than or equal to the first quantity, or the first quantity is less than or equal to the total quantity.

12. The apparatus of claim 9, wherein the processor executable instructions further cause the apparatus to:

receive, via the user interface, a request to restore the first graph; and transform, based on the quantity of transformation levels and a result of applying the at least one wavelet function to one or more database records of the plurality of database records, the second graph, wherein the transformed second graph is indicative of the first graph.

13. An apparatus comprising:
one or more processors; and
memory storing processor executable instructions that, when executed by the one or more processors, cause the apparatus to:

receive, via a user interface, a request to transform a first graph, wherein the first graph indicative of a plurality of database records;

transform, based on the request, and based on a first wavelet function and a second wavelet function applied to one or more database records of the plurality of database records, the first graph;

provide, at the user interface, based on the transformed first graph, a second graph indicative of a first portion of the plurality of database records;

receive a request to restore the first graph; and generate, based on a result of applying the first wavelet function, a third graph indicative of the first graph.

14. The apparatus of claim 13, wherein request comprises a request to increase a resolution of the first graph.

15. The apparatus of claim 13, wherein the first wavelet function comprises a high pass wavelet function, and wherein the processor executable instructions that cause the apparatus to transform the first graph further cause the apparatus to:

apply the high pass wavelet function to a second portion of the plurality of database records, wherein the second portion comprises at least one database record that is not within the first portion, and wherein the result of applying the first wavelet function comprises a result of applying the high pass wavelet function to the second portion.

16. The apparatus of claim 13, wherein the processor executable instructions further cause the apparatus to determine, based on a ceiling function, a quantity of transformation levels to be applied to the first graph, and wherein the processor executable instructions that cause the apparatus to transform the first graph further cause the apparatus to transform, based on the quantity of transformation levels, the first graph.

17. An apparatus comprising:
one or more processors; and
memory storing processor executable instructions that, when executed by the one or more processors, cause the apparatus to:
provide, at a user interface, a first graph indicative of a first selection of a plurality of database records;
determine an amount of change in a resolution of the first graph, based on a request received at the user interface to:
reduce the first selection, or
expand the first selection;
transform, based on at least one wavelet function and the determined amount of change, the first selection of the plurality of database records;
store a result of the transformation; and
provide, at the user interface, a second graph displaying a representation of the transformed first selection.

18. The apparatus of claim 17, wherein the transformed first selection of the plurality of database records comprises reduced data or expanded data, wherein the reduced data comprises a portion of the first selection, and wherein the expanded data comprises the first selection and at least one additional database record of the plurality of database records.

19. The apparatus of claim 18, wherein the processor executable instructions further cause the apparatus to at least one of:
restore, based on the result of the transformation and the reduced data or the expanded data, the first selection; or
provide, at the user interface, a third graph indicative of the first selection.

20. A non-transitory computer readable medium storing processor executable instructions that, when executed by at least one processor, cause the at least one processor to:
provide, at a user interface, a first graph representing a relationship between at least two data element types of a first selection of a plurality of database records, wherein the plurality of database records comprises data values for corresponding data element types;
convert the data values of the plurality of database records into corresponding vectors, wherein each corresponding vector comprises data values of a row of the first selection of the plurality of database records for each of the at least two data element types;
determine an amount of change in a resolution of the first graph, based on a request received at the user interface to:
reduce the first selection, or
expand the first selection;
transform, based on the determined amount of change and a wavelet function, at least one of the corresponding vectors to one of reduced data or expanded data, wherein the reduced data comprises a portion of the first selection, and wherein the expanded data comprises the first selection and at least one additional database record;
provide, at the user interface, a second graph representing a relationship between the at least two of the data element types based on the transformed at least one of the corresponding vectors;
store information indicative of the at least one of the corresponding vectors in memory, wherein the information is a result of the transformation; and
restore, based on the information indicative of the at least one of the corresponding vectors, the first selection.

21. The non-transitory computer readable medium of claim 20, wherein the processor executable instructions that cause the at least one processor to transform the at least one of the corresponding vectors based on the wavelet function further cause the at least one processor to perform an inverse wavelet transform to the at least one of the corresponding vectors.

22. The non-transitory computer readable medium of claim 20, wherein the processor executable instructions that cause the at least one processor to provide the second graph further cause the at least one processor to rescale the transformed at least one of the corresponding vectors to match a scale of the at least one of the corresponding vectors before transformation.

23. The non-transitory computer readable medium of claim 20, wherein the processor executable instructions that cause the at least one processor to transform the at least one of the corresponding vectors based on the wavelet function further cause the at least one processor to:
determine a coefficient based on a vector of the at least one of the corresponding vectors; and
multiply the wavelet function by the coefficient.

24. A non-transitory computer readable medium storing processor executable instructions that, when executed by at least one processor, cause the at least one processor to:
provide, at a user interface, a first graph representing a relationship between at least two data element types of a first selection of a plurality of database records, wherein the plurality of database records comprises data values for corresponding data element types;
reduce the first selection of the plurality of database records according to a transformation based on at least one first wavelet function and an amount of change in a resolution of the first graph;
store information indicative of the first selection in memory, wherein the information is a result of the transformation;
display, at the user interface, the reduced first selection comprising a second graph representing a relationship between at least two of the data element types based on the reduced first selection, wherein the user interface is configured to transition between displaying the reduced first selection and displaying the first selection in response to a selection, at the user interface, of a resolution level of the second graph; and
restore the first selection based on the information indicative of the first selection.

25. The non-transitory computer readable medium of claim 24, wherein the processor executable instructions that cause the at least one processor to display the reduced first selection further cause the at least one processor to provide, at the user interface, a control configured to select the resolution level of the second graph.

26. The non-transitory computer readable medium of claim 24, wherein the processor executable instructions further cause the at least one processor to:
expand the reduced first selection to obtain a second selection of the plurality of database records based on at least one second wavelet function; and
display the second selection at the user interface.

27. The non-transitory computer readable medium of claim 26, wherein the processor executable instructions that cause the at least one processor to expand the reduced first selection to obtain the second selection further cause the at least one processor to at least one of:
multiply a wavelet function of the at least one second wavelet function by a corresponding coefficient, and wherein the corresponding coefficient is based on the reduced first selection; or
perform an inverse wavelet transform to the reduced first selection.

28. A non-transitory computer readable medium storing processor executable instructions that, when executed by at least one processor, cause the at least one processor to:
receive, via a user interface, a request to transform a first graph, wherein the first graph is based on a portion of a plurality of database records, and wherein the request is indicative of a first quantity of the portion of the plurality of database records to be displayed;
determine, based on the first quantity indicated by the request, and based on a total quantity of the plurality of database records, a quantity of transformation levels to be applied to the first graph;
transform, based on the quantity of transformation levels and at least one wavelet function, the first graph; and
provide, at the user interface, based on the transformed first graph, a second graph comprising the first quantity of the portion of the plurality of database records.

29. The non-transitory computer readable medium of claim 28, wherein the request comprises a request to increase a resolution of the first graph, and wherein the processor executable instructions that cause the at least one processor to determine the quantity of transformation levels further cause the at least one processor to determine, based on a ceiling function, the quantity of transformation levels, wherein the ceiling function comprises a ratio of the total quantity to the first quantity.

30. The non-transitory computer readable medium of claim 28, wherein at least one of: the quantity of transformation levels comprises a maximum that is less than or equal to the first quantity, or the first quantity is less than or equal to the total quantity.

31. The non-transitory computer readable medium of claim 28, wherein the processor executable instructions further cause the at least one processor to:
receive, via the user interface, a request to restore the first graph; and
transform, based on the quantity of transformation levels and a result of applying the at least one wavelet function to one or more database records of the plurality of database records, the second graph, wherein the transformed second graph is indicative of the first graph.

32. A non-transitory computer readable medium storing processor executable instructions that, when executed by at least one processor, cause the at least one processor to:
receive, via a user interface, a request to transform a first graph, wherein the first graph indicative of a plurality of database records;
transform, based on the request, and based on a first wavelet function and a second wavelet function applied to one or more database records of the plurality of database records, the first graph;
provide, at the user interface, based on the transformed first graph, a second graph indicative of a first portion of the plurality of database records;
receive a request to restore the first graph; and
generate, based on a result of applying the first wavelet function, a third graph indicative of the first graph.

33. The non-transitory computer readable medium of claim 32, wherein request comprises a request to increase a resolution of the first graph.

34. The non-transitory computer readable medium of claim 32, wherein the first wavelet function comprises a high pass wavelet function, and wherein the processor executable instructions that cause the at least one processor to transform the first graph further cause the at least one processor to:
apply the high pass wavelet function to a second portion of the plurality of database records, wherein the second portion comprises at least one database record that is not within the first portion, and wherein the result of applying the first wavelet function comprises a result of applying the high pass wavelet function to the second portion.

35. The non-transitory computer readable medium of claim 32, wherein the processor executable instructions further cause the at least one processor to determine, based on a ceiling function, a quantity of transformation levels to be applied to the first graph, and wherein the processor executable instructions that cause the at least one processor to transform the first graph further cause the at least one processor to transform, based on the quantity of transformation levels, the first graph.

36. A non-transitory computer readable medium storing processor executable instructions that, when executed by at least one processor, cause the at least one processor to:
provide, at a user interface, a first graph indicative of a first selection of a plurality of database records;
determine an amount of change in a resolution of the first graph, based on a request received at the user interface to:
reduce the first selection, or
expand the first selection;
transform, based on at least one wavelet function and the determined amount of change, the first selection of the plurality of database records;
store a result of the transformation; and
provide, at the user interface, a second graph displaying a representation of the transformed first selection.

37. The non-transitory computer readable medium of claim 36, wherein the transformed first selection of the plurality of database records comprises reduced data or expanded data, wherein the reduced data comprises a portion of the first selection, and wherein the expanded data comprises the first selection and at least one additional database record of the plurality of database records.

38. The non-transitory computer readable medium of claim 36, wherein the processor executable instructions further cause the at least one processor to at least one of:
   restore, based on the result of the transformation and the reduced data or the expanded data, the first selection; or
   provide, at the user interface, a third graph indicative of the first selection.

* * * * *